(12) United States Patent
Takada et al.

(10) Patent No.: US 8,013,051 B2
(45) Date of Patent: Sep. 6, 2011

(54) LIQUID COMPOSITION, IMAGE FORMING METHOD, CARTRIDGE, RECORDING UNIT AND INK JET RECORDING APPARATUS

(75) Inventors: Yuko Takada, Yokohama (JP); Masashi Tsujimura, Kawasaki (JP); Katsuhiro Shirota, Kawasaki (JP); Shinichi Hakamada, Kawasaki (JP); Maiko Yamada, Yokohama (JP); Sayoko Harigaya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 425 days.

(21) Appl. No.: 12/025,935

(22) Filed: Feb. 5, 2008

(65) Prior Publication Data

US 2008/0193659 A1   Aug. 14, 2008

(30) Foreign Application Priority Data

| Feb. 9, 2007 | (JP) | ................. | 2007-030897 |
| Feb. 9, 2007 | (JP) | ................. | 2007-031184 |
| Feb. 9, 2007 | (JP) | ................. | 2007-031329 |
| Jan. 25, 2008 | (JP) | ................. | 2008-014933 |

(51) Int. Cl.
*C08L 83/04* (2006.01)
*B41J 2/175* (2006.01)

(52) U.S. Cl. ........... 524/506; 524/500; 347/86; 347/100

(58) Field of Classification Search .................. None
See application file for complete search history.

(56) References Cited

U.S. PATENT DOCUMENTS

| 3,366,590 | A | * | 1/1968 | Taft | ............................... | 524/819 |
| 3,389,110 | A | * | 6/1968 | Taft | ............................... | 524/460 |
| 4,013,607 | A | * | 3/1977 | Dwyer et al. | ................... | 524/428 |
| 4,177,178 | A | * | 12/1979 | Das et al. | ....................... | 524/512 |
| 4,597,794 | A | * | 7/1986 | Ohta et al. | ...................... | 347/100 |
| 4,804,411 | A |   | 2/1989 | Eida et al. | ........................ | 106/22 |
| 4,864,324 | A |   | 9/1989 | Shirota et al. | .................. | 346/1.1 |
| 5,059,246 | A |   | 10/1991 | Yamamoto et al. | ............. | 106/22 |
| 5,074,914 | A |   | 12/1991 | Shirota et al. | ................... | 106/22 |
| 5,106,417 | A | * | 4/1992 | Hauser et al. | .................. | 524/104 |
| 5,110,356 | A |   | 5/1992 | Shirota et al. | ................... | 106/22 |
| 5,118,351 | A |   | 6/1992 | Shirota et al. | ................... | 106/22 |
| 5,123,960 | A |   | 6/1992 | Shirota et al. | ................... | 106/22 |
| 5,135,570 | A |   | 8/1992 | Eida et al. | ........................ | 106/22 |
| 5,135,571 | A |   | 8/1992 | Shirota et al. | ................... | 106/22 |

(Continued)

FOREIGN PATENT DOCUMENTS

| CN | 1693383 A | 11/2005 |
| CN | 1898347 A | 1/2007 |
| EP | 0 882 770 A1 | 12/1998 |

(Continued)

OTHER PUBLICATIONS

Momentive Performance Materials, "Silwet Surfactants", 2008, 28 pages.*

(Continued)

*Primary Examiner* — Robert Loewe

(74) *Attorney, Agent, or Firm* — Fitzpatrick, Cella, Harper & Scinto

(57) ABSTRACT

A liquid composition which can achieve superior scratch resistance of images at such a level that coloring materials are hardly scraped off even when images are scratched with finger nails under application of such strong pressure as to scratch a recording medium at its non-recorded areas. The liquid composition contains at least a modified siloxane compound having specific structure and a polymer whose acid value and hydrogen bond parameter ($\delta h$) are specified.

17 Claims, 4 Drawing Sheets

U.S. PATENT DOCUMENTS

| | | | | |
|---|---|---|---|---|
| 5,139,573 | A | 8/1992 | Yamamoto et al. | 106/22 |
| 5,141,558 | A | 8/1992 | Shirota et al. | 106/22 |
| 5,151,128 | A | 9/1992 | Fukushima et al. | 106/20 |
| 5,172,133 | A * | 12/1992 | Suga et al. | 347/100 |
| 5,190,581 | A | 3/1993 | Fukushima et al. | 106/20 D |
| 5,216,437 | A | 6/1993 | Yamamoto et al. | 346/1.1 |
| 5,220,347 | A | 6/1993 | Fukushima et al. | 346/1.1 |
| 5,221,333 | A | 6/1993 | Shirota et al. | 106/20 D |
| 5,231,417 | A | 7/1993 | Shirota et al. | 346/1.1 |
| 5,248,991 | A | 9/1993 | Shirota et al. | 346/1.1 |
| 5,250,121 | A | 10/1993 | Yamamoto et al. | 106/22 R |
| 5,254,157 | A | 10/1993 | Koike et al. | 106/20 D |
| 5,258,066 | A | 11/1993 | Kobayashi et al. | 106/22 R |
| 5,292,613 | A | 3/1994 | Sato et al. | |
| 5,296,022 | A | 3/1994 | Kobayashi et al. | 106/20 D |
| 5,329,305 | A | 7/1994 | Fukushima et al. | 347/95 |
| 5,358,558 | A | 10/1994 | Yamamoto et al. | 106/22 R |
| 5,427,611 | A | 6/1995 | Shirota et al. | 106/22 A |
| 5,500,023 | A | 3/1996 | Koike et al. | 8/499 |
| 5,515,093 | A | 5/1996 | Haruta et al. | 347/101 |
| 5,540,764 | A | 7/1996 | Haruta et al. | 106/20 R |
| 5,593,757 | A | 1/1997 | Kashiwazaki et al. | 428/195 |
| 5,596,027 | A | 1/1997 | Mead et al. | |
| 5,606,356 | A | 2/1997 | Noguchi et al. | 347/100 |
| 5,614,007 | A | 3/1997 | Kurabayashi et al. | 106/22 R |
| 5,620,793 | A | 4/1997 | Suzuki et al. | 428/342 |
| 5,621,447 | A | 4/1997 | Takizawa et al. | 347/88 |
| 5,640,187 | A | 6/1997 | Kashiwazaki et al. | 347/101 |
| 5,658,376 | A | 8/1997 | Noguchi et al. | 106/31.43 |
| 5,680,165 | A | 10/1997 | Takizawa et al. | 347/88 |
| 5,696,182 | A | 12/1997 | Kashiwazaki et al. | 523/161 |
| 5,698,478 | A | 12/1997 | Yamamoto et al. | 442/153 |
| 5,700,314 | A | 12/1997 | Kurbayashi et al. | 106/31.27 |
| 5,709,950 | A * | 1/1998 | Burgman et al. | 428/423.1 |
| 5,733,971 | A | 3/1998 | Feldmann-Krane et al. | 524/837 |
| 5,734,403 | A | 3/1998 | Suga et al. | 347/101 |
| 5,764,261 | A | 6/1998 | Koike et al. | 347/100 |
| 5,781,216 | A | 7/1998 | Haruta et al. | 347/106 |
| 5,782,967 | A | 7/1998 | Shirota et al. | 106/31.58 |
| 5,792,249 | A | 8/1998 | Shirota et al. | 106/31.27 |
| 5,869,220 | A * | 2/1999 | Hallock et al. | 430/281.1 |
| 5,902,387 | A | 5/1999 | Suzuki et al. | 106/22 R |
| 5,913,971 | A * | 6/1999 | Fujimatsu et al. | 106/31.86 |
| 5,922,625 | A | 7/1999 | Haruta et al. | 442/75 |
| 5,968,244 | A | 10/1999 | Ueda et al. | |
| 6,036,307 | A | 3/2000 | Hakamada et al. | 347/106 |
| 6,039,795 | A | 3/2000 | Fukuo et al. | |
| 6,084,006 | A | 7/2000 | Kashiwazaki et al. | 523/160 |
| 6,114,411 | A | 9/2000 | Nakamura et al. | |
| 6,139,939 | A | 10/2000 | Haruta et al. | 428/195 |
| 6,162,510 | A | 12/2000 | Kashiwazaki et al. | 427/511 |
| 6,188,850 | B1 | 2/2001 | Sakaki et al. | 399/1 |
| 6,203,604 | B1 | 3/2001 | Kashiwazaki et al. | 106/31.5 |
| 6,214,963 | B1 | 4/2001 | Noguchi et al. | 528/71 |
| 6,221,141 | B1 | 4/2001 | Takada et al. | 106/31.6 |
| 6,221,933 | B1 | 4/2001 | Zhu et al. | |
| 6,248,482 | B1 | 6/2001 | Kashiwazaki et al. | 430/7 |
| 6,270,905 | B1 * | 8/2001 | Swarup et al. | 428/463 |
| 6,329,060 | B1 * | 12/2001 | Barkac et al. | 428/423.1 |
| 6,342,095 | B1 | 1/2002 | Takizawa et al. | 106/31.27 |
| 6,379,443 | B1 | 4/2002 | Komatsu et al. | |
| 6,391,947 | B1 | 5/2002 | Noguchi et al. | 524/84 |
| 6,394,597 | B1 | 5/2002 | Koike et al. | 347/106 |
| 6,398,355 | B1 | 6/2002 | Shirota et al. | 347/100 |
| 6,412,936 | B1 | 7/2002 | Mafune et al. | 347/100 |
| 6,426,766 | B1 | 7/2002 | Shirota et al. | 347/106 |
| 6,435,658 | B1 | 8/2002 | Kato et al. | 347/43 |
| 6,460,987 | B1 | 10/2002 | Katsuragi et al. | 347/100 |
| 6,474,803 | B1 | 11/2002 | Shirota et al. | 347/100 |
| 6,528,146 | B2 | 3/2003 | Okuda et al. | |
| 6,530,656 | B1 | 3/2003 | Teraoka et al. | 347/100 |
| 6,540,329 | B1 | 4/2003 | Kaneko et al. | 347/43 |
| 6,540,344 | B2 | 4/2003 | Kashiwazaki et al. | 347/100 |
| 6,552,156 | B2 | 4/2003 | Noguchi et al. | 528/71 |
| 6,582,070 | B2 | 6/2003 | Takada et al. | 347/100 |
| 6,585,366 | B2 | 7/2003 | Nagata et al. | |
| 6,586,521 | B2 * | 7/2003 | Blum et al. | 524/522 |
| 6,619,791 | B2 | 9/2003 | Tochihara et al. | 347/100 |
| 6,648,953 | B2 | 11/2003 | Yamazaki et al. | |
| 6,659,601 | B2 | 12/2003 | Goto et al. | 347/100 |
| 6,676,254 | B2 | 1/2004 | Nagashima et al. | 347/100 |
| 6,676,738 | B2 * | 1/2004 | Sano et al. | 106/31.75 |
| 6,698,876 | B2 | 3/2004 | Sato et al. | 347/100 |
| 6,706,104 | B2 | 3/2004 | Takuhara et al. | 106/31.6 |
| 6,706,105 | B2 | 3/2004 | Takada et al. | 106/31.6 |
| 6,723,137 | B1 | 4/2004 | Hakamada et al. | 8/549 |
| 6,729,718 | B2 | 5/2004 | Goto et al. | 347/100 |
| 6,767,090 | B2 * | 7/2004 | Yatake et al. | 347/100 |
| 6,779,884 | B1 | 8/2004 | Ma et al. | |
| 6,794,427 | B2 | 9/2004 | Kurabayashi et al. | 523/161 |
| 6,797,764 | B2 * | 9/2004 | Sagiv et al. | 524/501 |
| 6,827,433 | B2 * | 12/2004 | Takemoto et al. | 347/100 |
| 6,846,353 | B2 | 1/2005 | Sano et al. | |
| 6,848,781 | B2 | 2/2005 | Ogino et al. | 347/105 |
| 6,860,593 | B2 | 3/2005 | Kashiwazaki et al. | 347/100 |
| 6,866,379 | B2 * | 3/2005 | Yau et al. | 347/100 |
| 6,874,881 | B2 | 4/2005 | Suzuki et al. | 347/100 |
| 6,877,851 | B2 | 4/2005 | Watanabe | |
| 6,929,362 | B2 | 8/2005 | Takada et al. | 347/100 |
| 6,932,465 | B2 | 8/2005 | Nito et al. | 347/96 |
| 6,935,732 | B2 | 8/2005 | Takada et al. | 347/96 |
| 6,976,755 | B2 | 12/2005 | Sato et al. | 347/100 |
| 7,005,461 | B2 | 2/2006 | Sanada et al. | 523/160 |
| 7,029,109 | B2 | 4/2006 | Shirota et al. | 347/100 |
| 7,055,943 | B2 | 6/2006 | Suzuki et al. | 347/100 |
| 7,141,105 | B2 | 11/2006 | Udagawa et al. | 106/31.49 |
| 7,144,449 | B2 | 12/2006 | Udagawa et al. | 106/31.15 |
| 7,148,268 | B2 | 12/2006 | Zhu et al. | |
| 7,185,978 | B2 | 3/2007 | Nagashima et al. | 347/100 |
| 7,195,340 | B2 | 3/2007 | Nagashima et al. | 347/56 |
| 7,208,032 | B2 | 4/2007 | Hakamada et al. | 106/31.27 |
| 7,276,110 | B2 | 10/2007 | Tsujimura et al. | 106/31.27 |
| 7,276,112 | B2 | 10/2007 | Tokuda et al. | 106/31.6 |
| 7,291,214 | B2 | 11/2007 | Tsuji et al. | 106/31.8 |
| 7,291,361 | B2 | 11/2007 | Ogino et al. | 427/258 |
| 7,297,194 | B2 | 11/2007 | Shinjo et al. | 106/31.27 |
| 7,297,203 | B2 | 11/2007 | Takada et al. | 106/31.8 |
| 7,354,145 | B2 | 4/2008 | Nito et al. | 347/96 |
| 7,377,631 | B2 | 5/2008 | Takada et al. | 347/100 |
| 2002/0017219 | A1 | 2/2002 | Yamazaki et al. | |
| 2003/0018119 | A1 * | 1/2003 | Frenkel et al. | 524/502 |
| 2003/0216515 | A1 * | 11/2003 | Swarup et al. | 525/123 |
| 2003/0216516 | A1 * | 11/2003 | Swarup et al. | 525/123 |
| 2003/0226473 | A1 | 12/2003 | Ishimoto | 106/31.6 |
| 2004/0030001 | A1 | 2/2004 | Ma et al. | |
| 2004/0035320 | A1 * | 2/2004 | Sano et al. | 106/31.6 |
| 2004/0127601 | A1 * | 7/2004 | Sano et al. | 523/160 |
| 2004/0141041 | A1 * | 7/2004 | Tsutsumi et al. | 347/102 |
| 2004/0249061 | A1 * | 12/2004 | Sunkara et al. | 524/589 |
| 2005/0004263 | A1 * | 1/2005 | Gould et al. | 523/160 |
| 2005/0090579 | A1 | 4/2005 | Zhu et al. | |
| 2005/0124726 | A1 | 6/2005 | Yatake et al. | |
| 2005/0204955 | A1 | 9/2005 | Nagashima et al. | 106/31.59 |
| 2005/0228069 | A1 | 10/2005 | Kataoka et al. | 523/160 |
| 2005/0250869 | A1 | 11/2005 | Claes et al. | |
| 2005/0282930 | A1 | 12/2005 | Fu et al. | 523/160 |
| 2006/0007288 | A1 | 1/2006 | Takada et al. | |
| 2006/0007289 | A1 | 1/2006 | Nito et al. | 347/100 |
| 2006/0023044 | A1 | 2/2006 | Bauer | 347/100 |
| 2006/0089424 | A1 | 4/2006 | Sanada et al. | 523/160 |
| 2006/0098067 | A1 | 5/2006 | Imai et al. | 347/100 |
| 2006/0098068 | A1 | 5/2006 | Hakamada et al. | 347/100 |
| 2006/0103704 | A1 | 5/2006 | Hakamada et al. | 347/100 |
| 2006/0122330 | A1 * | 6/2006 | Wu et al. | 525/127 |
| 2006/0125895 | A1 | 6/2006 | Nito et al. | 347/100 |
| 2006/0160923 | A1 * | 7/2006 | Koganehira et al. | 523/160 |
| 2006/0173096 | A1 | 8/2006 | Ota | |
| 2007/0029522 | A1 | 2/2007 | Udagawa et al. | 252/301.16 |
| 2007/0034114 | A1 | 2/2007 | Udagawa et al. | 106/31.15 |
| 2007/0097155 | A1 | 5/2007 | Imai et al. | 347/1 |
| 2007/0097156 | A1 | 5/2007 | Udagawa et al. | 347/1 |
| 2007/0112095 | A1 | 5/2007 | Moribe et al. | 523/160 |
| 2007/0134451 | A1 | 6/2007 | Hakamada et al. | 428/32.38 |
| 2007/0188572 | A1 | 8/2007 | Takayama et al. | 347/100 |
| 2007/0191508 | A1 | 8/2007 | Nakagawa et al. | 523/160 |
| 2008/0187726 | A1 | 8/2008 | Sakai et al. | |

FOREIGN PATENT DOCUMENTS

| | | |
|---|---|---|
| EP | 0 974 626 A1 | 1/2000 |
| EP | 1 153 992 A1 | 11/2001 |
| EP | 1 234 859 A1 | 8/2002 |
| JP | 2000-108495 A | 4/2000 |
| JP | 2000-153677 | 6/2000 |
| JP | 2003-170650 | 6/2003 |
| JP | 2003-192964 A | 7/2003 |
| JP | 2004-099766 | 4/2004 |
| JP | 2004-284362 A | 10/2004 |
| JP | 2005-081754 | 3/2005 |
| JP | 2005-263969 A | 9/2005 |
| WO | 01/90262 A2 | 11/2001 |

OTHER PUBLICATIONS van Krevelen, Properties of Polymers, Second Edition, Chapter 7, pp. 129-159 (1976).

May 20, 2008 European Office Action in European Patent Appln. No. 08151161.0.

Apr. 29, 2010 European Search Report in European Patent Application No. 08151160.2.

Akzo Nobel, "Structuuridentificatie van siliconenadditieven", p. 49.

May 11, 2010 Chinese Official Action in Chinese Patent Application No. 200810074220.3.

* cited by examiner

LIQUID COMPOSITION, IMAGE FORMING METHOD, CARTRIDGE, RECORDING UNIT AND INK JET RECORDING APPARATUS

BACKGROUND OF THE INVENTION

1. Field of the Invention

This invention relates to a liquid composition used together with a pigment ink, which makes use of a pigment as a coloring material, and also relates to an image forming method applicable to an ink jet recording method, a cartridge, a recording unit and an ink jet recording apparatus which make use of the liquid composition.

2. Description of the Related Art

In inks for ink jet recording, images formed using pigment inks, which contain pigments as coloring materials, are superior to images formed using dye inks, which contain dyes as coloring materials, in respect of fastness such as light-fastness and ozone fastness. On the other hand, the images formed using pigment inks have a problem that they are inferior to the images formed using dye inks, in that coloring materials may be scraped off when images are rubbed with fingers or the like, i.e., they are inferior in scratch resistance.

To cope with such a problem, many proposals are made on how to protect recorded images by applying a surface coat onto the images. For example, a proposal is made on that a protective-layer transfer sheet is thermally transferred to images to protect the images (see Japanese Patent Application Laid-open No. 2000-153677; hereinafter "Patent Document 1"). A proposal is also made on that heat and pressure are simultaneously applied to images to protect the images (see Japanese Patent Application Laid-open No. 2003-170650; hereinafter "Patent Document 2"). A proposal is further made on that images formed using pigment inks are provided with a compound having film forming properties, to protect the images (see Japanese Patent Applications Laid-open No. 2004-99766 and No. 2005-81754; hereinafter "Patent Documents 3 and 4", respectively).

However, scratch resistance required for images displayed outdoors, such as posters, panels, signs and pop advertisements is so high as to be insufficient at all if it is at such a level that, as in conventionally available techniques, any coloring materials do not come scraped off when images are rubbed with fingers or the like.

For example, when posters and advertisements are printed, fairly large recording mediums of, e.g., A0 size and A1 size are often used, and it is common for them to be rolled up into cylindrical shape when recording mediums on which images have been formed are carried. Hence, problems as stated below may arise. When a recording medium is rolled up, images may be rubbed at edged portions such as corners, of the recording medium. On such an occasion, even where conventional pigment inks are used which are deemed to satisfy the scratch resistance of images at a high level, the images formed may be scratched to make coloring materials scraped off. Such a problem may fairly frequently arise. Problems like this may also arise in other circumstances. For example, there is a case in which, when images formed using pigment inks are posted outdoors as posters, the images are strongly scratched with something sharp such as finger nails. In such a case as well, as in the foregoing, such a problem that coloring materials are scraped off may fairly frequently arise.

To cope with such problems, the method disclosed in Patent Document 1 may be used, where what is aimed in the present invention may be achieved if measures are taken such that the protective layer is made to have a higher strength or have a larger layer thickness. However, in the cases of the methods disclosed in Patent Documents 1 and 2, a device or heat roller which performs thermal transfer is required to make apparatus complicated, and hence this is not so desirable. Accordingly, in recent years, it is sought to develop aqueous inks which can obtain images having scratch resistance higher enough than ever to make coloring materials not scraped off even when something sharp such as finger nails come into touch with the images.

As proposals regarding how the scratch resistance of images is improved when images are formed using pigment inks for ink jet recording, many proposals are made besides those disclosed in the above four Patent Documents. However, according to studies made by the present inventors, what is the best that can be given even by the use of any of such techniques is to achieve scratch resistance of a level that images are not scratched when touched with fingers.

For example, in Patent Documents 3 and 4, a top coat liquid or a colorless ink is incorporated with a water-soluble polymer. However, studies made by the present inventors have revealed that, however much the polymer effective in improving the scratch resistance of images is contained in the liquid composition, the scratch resistance of images is improved only to a certain level because the binding force between a recording medium, a polymer and a pigment depends only on the properties of the polymer. That is, in the invention disclosed in Patent Documents 3 and 4 as well, in which the scratch resistance of images is improved relying only on the performance of the polymer, the scratch resistance is at a level not beyond what is classified as conventional one, and has not at all reached the level of scratch resistance that is aimed in the present invention. More specifically, these techniques have not reached the high-level scratch resistance as aimed in the present invention, such that "coloring materials are hardly scraped off even when images are scratched with something sharp such as finger nails under application of such a strong pressure as to scratch a recording medium at its non-recorded areas". Especially where the content of the pigment solid matter in an ink is 1.2% by mass or less based on the total mass of the ink, the solid matter that functions as a filler is in so small content that it may be difficult to achieve the high scratch resistance as aimed in the present invention by the use of the polymer alone.

The foregoing is apparent also from evaluation methods in Examples in Patent Documents 3 and 4. More specifically, in Patent Document 3, plain paper is placed on images, and a specific weight is put thereon to rub the images. In Patent Document 4, images are rubbed with an eraser. That is, these evaluation methods are those for evaluating the extent of deterioration when friction is given to the images, and can be said to be based on an evaluation level that is fairly gentler than the level of the scratch resistance as aimed in the present invention.

Further, in the invention disclosed in Patent Document 3, the top coat liquid for protecting the images is applied in an amount of two or more times the amount of the ink to be applied, and it takes a fairly long time until it comes fixed. This is apparent also from the fact that in Examples in Patent Document 3 the scratch resistance evaluation test is conducted after 24 hours. Where images are formed on a recording medium having an ink-receiving layer, a problem may also arise such that the recording medium can not absorb the liquid when the liquid is applied in an amount beyond the ability to retain the liquid, of the ink-receiving layer. That is, it can be said to be not practical to apply the top coat liquid in an amount far beyond the amount of the ink necessary for forming images, as in the invention disclosed in Patent Document 3.

SUMMARY OF THE INVENTION

Accordingly, an object of the present invention is to provide a liquid composition which can satisfy ejection property such as anti-stick quality and reliability such as storage stability so as to be applicable to ink jet recording as well, and at the same time can improve the scratch resistance of images formed using pigment inks, to a high level that has not been achieved conventionally. Stated specifically, the present invention is to provide a liquid composition which can obtain images having scratch resistance of such a high level that coloring materials may hardly be scraped off even when images are scratched with finger nails under application of such a strong pressure as to scratch a recording medium at its non-recorded areas.

Another object of the present invention is to provide an image forming method applicable to an ink jet recording method, a cartridge, a recording unit and an ink jet recording apparatus which can obtain images having such a high-level scratch resistance.

The above objects can be achieved by the present invention described below. That is, the liquid composition according to the present invention is a liquid composition containing at least a modified siloxane compound and a polymer; the modified siloxane compound being at least one selected from the group consisting of a modified siloxane compound represented by the following Formula (1), a modified siloxane compound represented by the following Formula (2) and a modified siloxane compound represented by the following Formula (3); and the polymer being at least one selected from the group consisting of a polymer A which has an acid value of from 90 mgKOH/g or more to 150 mgKOH/g or less and in which a hydrogen bond parameter ($\delta$h) of the polymer that is obtained by the solubility parameters of monomers constituting the polymer is from 1.0 cal$^{0.5}$/cm$^{1.5}$ or more to 3.7 cal$^{0.5}$/cm$^{1.5}$ or less, and a polymer B which has an acid value of from more than 150 mgKOH/g to 200 mgKOH/g or less and in which a hydrogen bond parameter ($\delta$h) of the polymer that is obtained by the solubility parameters of monomers constituting the polymer is from 1.0 cal$^{0.5}$/cm$^{1.5}$ or more to 1.5 cal$^{0.5}$/cm$^{1.5}$ or less.

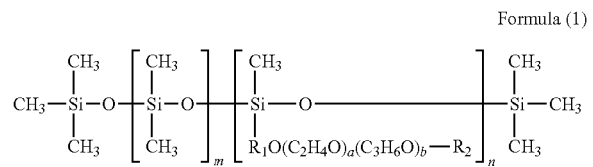

Formula (1)

where the modified siloxane compound represented by Formula (1) has a weight average molecular weight of from 0,000 or more to 30,000 or less; in Formula (1), $R_1$ is an alkylene group having 1 to 20 carbon atom(s), $R_2$ is a hydrogen atom or an alkyl group having 1 to 20 carbon atom(s), m is from 1 or more to 250 or less, n is from 1 or more to 100 or less, a is from 1 or more to 100 or less, and b is from 0 or more to 100 or less.

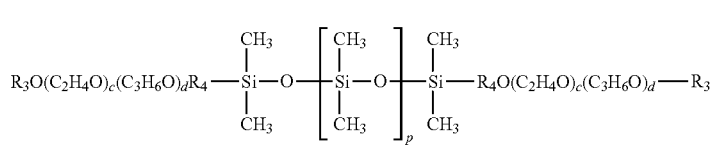

Formula (2)

where the modified siloxane compound represented by Formula (2) has a weight average molecular weight of from 8,000 or more to less than 50,000; in Formula (2), $R_3$'s are each independently a hydrogen atom or an alkyl group having 1 to 20 carbon atom(s), $R_4$'s are each independently an alkylene group having 1 to 20 carbon atom(s), p is from 1 or more to 450 or less, c is from 1 or more to 250 or less, and d is from 0 or more to 100 or less.

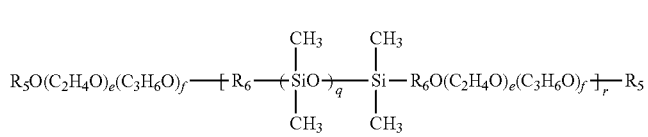

Formula (3)

where the modified siloxane compound represented by Formula (3) has a weight average molecular weight of from 8,000 or more to less than 50,000 and an HLB of from 1 or more to less than 7; in Formula (3), $R_5$'s are each independently a hydrogen atom or an alkyl group having 1 to 20 carbon atom(s), $R_6$ is an alkylene group having 1 to 20 carbon atom(s), q is from 1 or more to 100 or less, r is from 1 or more to 100 or less, e is from 1 or more to 100 or less, and f is from 0 or more to 100 or less.

The image forming method according to another embodiment of the present invention is an image forming method having the step of applying a pigment ink onto a recording medium and the step of applying a liquid composition onto the recording medium, and is characterized in that the above liquid composition is used as the liquid composition.

The cartridge according to still another embodiment of the present invention is a cartridge having a liquid composition storing portion which stores a liquid composition therein, and is characterized in that the liquid composition stored in the liquid composition storing portion is the above liquid composition.

The recording unit according to a further embodiment of the present invention is a recording unit having a liquid composition storing portion which stores a liquid composition therein and a recording head which ejects the liquid composition therefrom, and is characterized in that the liquid composition stored in the liquid composition storing portion is the above liquid composition.

The ink jet recording apparatus according to a still further embodiment of the present invention is an ink jet recording apparatus having a liquid composition storing portion which stores a liquid composition therein and a recording head which ejects the liquid composition therefrom, and is characterized in that the liquid composition stored in the liquid composition storing portion is the above liquid composition.

The liquid composition according to a still further embodiment of the present invention is a liquid composition containing a polymer and a modified siloxane compound, wherein the modified siloxane compound is at least one selected from the group consisting of a modified siloxane compound represented by the above Formula (1), a modified siloxane compound represented by the above Formula (2) and a modified siloxane compound represented by the above Formula (3), and the liquid composition is so constituted that reference evaluation images formed using the liquid composition in conjunction with a pigment ink may have a coefficient of dynamic friction of 0.40 or less.

According to the present invention, the scratch resistance of images formed using pigment inks can be made superior enough to be far beyond the scratch resistance at which the background art has ever aimed. More specifically, according to the present invention, a liquid composition is provided which can give images having superior scratch resistance of such a level that coloring materials may hardly be scraped off even when images are scratched with finger nails under application of such a strong pressure as to scratch a recording medium at its non-recorded areas.

According to other embodiments of the present invention, an image forming method applicable to an ink jet recording method, a cartridge, a recording unit and an ink jet recording apparatus are provided which can stably provide images having such a strikingly high-level scratch resistance as stated above.

Further features of the present invention will become apparent from the following description of exemplary embodiments with reference to the accompanying drawings.

DESCRIPTION OF THE EMBODIMENTS

The present invention is described below in detail by giving preferred embodiments. The largest point of the present invention is that images are formed using both a liquid composition containing a specific polymer described below and a specific modified siloxane compound and a pigment ink (hereinafter simply "ink" in some cases), whereby the surfaces of images formed using the ink are made slippery. As a result of making the surfaces of images slippery, the scratch resistance of the images can strikingly be more improved than that of images formed with conventional ink and liquid composition. That is, the present invention has been made on the basis of a new idea of taking note also of the frictional force acting between images and a material body (e.g., finger nails) coming into contact with the images, as being different from the idea that the scratch resistance of images is improved by utilizing only the film forming properties of a polymer, as in conventional techniques. Thus, according to the present invention, images can also be provided in which not only any coloring materials of images may not be scraped off but also any scratch marks may hardly remain even when the images are scratched with finger nails under application of such a strong pressure as to scratch a recording medium at its non-recorded areas.

Figure 1:
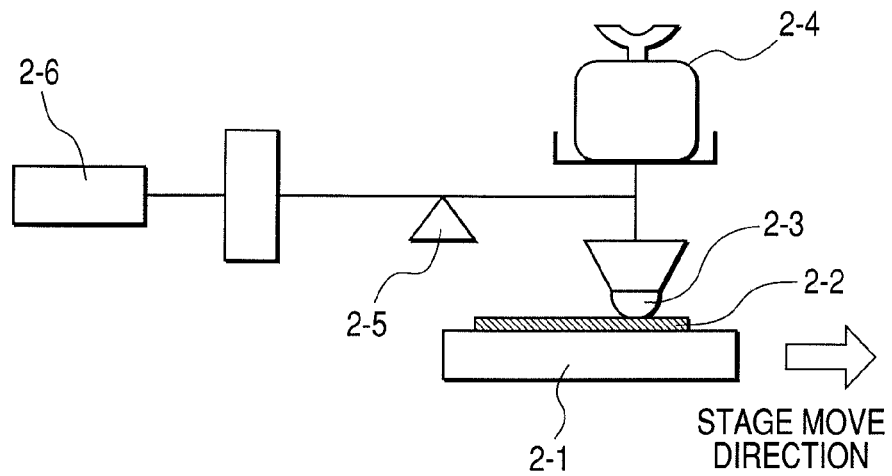
FIG. 1 is a diagrammatic view showing the concept of a scratch resistance test.

As a result of studies made by the present inventors, it has been found that the frictional force acting between images and any material body (e.g., finger nails) that may come into touch with the images, in other words, the slipperiness of image surfaces may be expressed by using the coefficient of dynamic friction as an index. The coefficient of dynamic friction may be measured in the following way by using a scratch resistance tester. FIG. 1 presents a diagrammatic view for illustrating a scratch resistance test.

In the test, a polymethyl methacrylate (PMMA) ball is used as a rubbing material 2-3 which causes scratches in a state close to scratches made by finger nails. Then, a surface property tester (trade named: HEIDON TRIBOGEAR Type 14DR, manufactured by Shinto Kagaku K.K.) is used to cause scratches in the following way. Stated specifically, as shown in FIG. 1, a PMMA ball to which a load is kept applied from above is vertically brought into touch with image surfaces, where a sample 2-2 placed on a working stage 2-1 is moved at a given speed to cause scratches.

The mass of a metal fitting for fastening the rubbing material 2-3 is kept removed with a balance mechanism 2-5. Then, the scratch resistance of images is evaluated by a vertical load (a weight 2-4) applied to the image surfaces. The horizontal-direction force acting on the rubbing material 2-3 when the stage is moved may be measured through a load cell 2-6 connected with the metal fitting. The coefficient of dynamic friction of image surfaces against the rubbing material may be measured from the ratio of horizontal-direction force to vertical-load force at the time of movement.

The present inventors have conducted the scratch resistance test in the manner as described above over various images, to make detailed studies. As a result, it has been found that, where images are formed on a recording medium having a coat layer, the images can satisfy the high-level scratch resistance as aimed in the present invention, as long as the coefficient of dynamic friction of images is 0.40 or less, more preferably less than 0.35, and particularly preferably 0.30 or less. The lower limit of the coefficient of dynamic friction is 0.00 or more.

Here is described the course through which the present inventors have come up with the constitution of the present invention in which the liquid composition containing the specific polymer described below and the specific modified siloxane compound is used in order to make images formed by a pigment ink have the coefficient of dynamic friction of 0.40 or less. To achieve the above object of the present invention, the present inventors have studied several kinds of liquid compositions containing several kinds of modified siloxane compounds which are conventionally deemed to be effective in improving the slipperiness of coating film surfaces. However, as a result of making a comparison between the coefficient of dynamic friction of images formed using a liquid composition containing any of the above-noted specific modified siloxane compounds and the coefficient of dynamic friction of images formed using a liquid composition not containing any of the above-noted modified siloxane compounds, it has been found that there is no difference in the values of the coefficient of dynamic friction. That is, the coefficient of dynamic friction aimed in the present invention has been found to be not achievable at all and the scratch resistance cannot be sufficiently achieved even in making use of the liquid composition containing any of the modified siloxane compounds the present inventors have studied. The reason is not clear why no change in coefficient of dynamic friction comes about on the images formed, even though the liquid compositions containing the modified siloxane compounds which are conventionally deemed to be effective in improving the slipperiness of coating film surfaces are thus used. However, the present inventors presume that the reason is as follows: As stated previously the modified siloxane compound present in the liquid composition penetrates into the recording medium together with an aqueous medium present in the liquid composition, and hence the recording medium is brought into such a state that no modified siloxane compound is present on its surface.

Accordingly, the present inventors have studied how to cause most of the modified siloxane compound in the liquid composition to remain on the surface of the recording medium. Then, the present inventors have first thought about utilizing the synergistic effect of the properties of the modified siloxane compound and the properties of the polymer. As a result, they have considered that the following constitution is most suitable for the achievement of the object of the present invention, and have forwarded their studies. The constitution is that the properties of the modified siloxane compound, which is highly hydrophilic, are utilized to make the pigment forming images or the polymer in the liquid composition adsorb the modified siloxane compound so as for the latter modified siloxane compound to be present on the recording medium together with the polymer.

First, the present inventors have made studies on the polymer to be contained in the liquid composition. As a result, they have come to the conclusion that, as a polymer capable of coming fixed on the recording medium to form a film having a certain high strength, at least one polymer selected from a polymer A and a polymer B having the following properties is most suitable. The polymer A is a polymer which has an acid value of from 90 mgKOH/g or more to 150 mgKOH/g or less and in which the hydrogen bond parameter ($\delta h$) of the polymer obtained by the solubility parameters of monomers constituting the polymer is at least 3.7 $cal^{0.5}/cm^{1.5}$ or less. The polymer B is a polymer which has an acid value of from more than 150 mgKOH/g to 200 mgKOH/g or less and in which the hydrogen bond parameter ($\delta h$) of the polymer obtained by the solubility parameters of monomers constituting the polymer is at least 1.5 $cal^{0.5}/cm^{1.5}$ or less. The hydrogen bond parameter ($\delta h$) is the value obtained by the solubility parameters inherent in monomers constituting the polymer. This will be described later.

The polymer usable as a constituent of the liquid composition of the present invention is by no means limited to the polymer A and polymer B described above. That is, the polymer contained together with the specific modified siloxane compound in the liquid composition is sufficient if only it can make the scratch resistance of images formed using inks the high-level scratch resistance as aimed in the present invention when it is incorporated in the liquid composition for formation of the images. Stated specifically, the polymer may be one capable of bringing about solid-liquid separation immediately after the liquid composition has been applied onto the recording medium and becoming fixed on the recording medium. Further, the polymer may be one which can provide a coefficient of dynamic friction of 0.40 or less for reference evaluation images formed using an ink and the liquid composition containing both the polymer and the specific modified siloxane compound detailed later. That is, any polymer may be used as a constituent of the liquid composition of the present invention as long as it can remain on the recording medium after the liquid composition has been applied onto the recording medium and form a film having a certain strength. Still further, the polymer particularly preferable for the present invention is one having such properties and also having properties of adsorbing the specific modified siloxane compound to improve the slipperiness of images, which is detailed later and is essential for the achievement of the object of the present invention. Here, the "reference evaluation images" termed in the present invention refer to images recorded using the liquid composition containing both the polymer and the specific modified siloxane compound and using a pigment ink under the following conditions. That is, the term refers to images formed under conditions of an ejection quantity of from 3 ng to 5 ng per liquid composition droplet, a resolution of 1,200 dpi×1,200 dpi, an 8-pass two-way recording and a recording duty of 50%.

The present inventors have next formed images by using an liquid composition containing at least one polymer selected from the polymer A and the polymer B having the above properties and the modified siloxane compound studied as above together with the ink, to examine the scratch resistance of the images formed. As a result, it has been found that, by using the modified siloxane compound, images can be obtained which have achieved a scratch resistance much higher than the scratch resistance of images formed using a liquid composition containing only the polymer having the above properties.

Accordingly, the present inventors have used the liquid composition containing both the polymer having the above properties and the specific modified siloxane compound found effective in lowering the scratch resistance and used an ink to form images to examine the coefficient of dynamic friction and scratch resistance of the images obtained. As a result, it has been found that the coefficient of dynamic friction of the images is 0.40 or less, and thus, by using the specific modified siloxane compound, images can be obtained which have much higher scratch resistance than the scratch resistance of images formed using a liquid composition containing only the polymer having the above properties and using an ink.

The foregoing results have led to the best constitution of the present invention, i.e., the liquid composition containing both at least one polymer selected from the polymer A and the polymer B each having the properties as described above and the specific modified siloxane compound. More specifically, at least one polymer selected from the polymer A and the polymer B, having the property described below is used. The polymer A is a polymer which has an acid value of from 90 mgKOH/g or more to 150 mgKOH/g or less and in which the hydrogen bond parameter ($\delta h$) of the polymer that is obtained by the solubility parameters of monomers constituting the polymer is from 1.0 $cal^{0.5}/cm^{1.5}$ or more to 3.7 $cal^{0.5}/cm^{1.5}$ or less. The polymer B is a polymer which has an acid value of from more than 150 mgKOH/g to 200 mgKOH/g or less and in which the hydrogen bond parameter ($\delta h$) of the polymer that is obtained by the solubility parameters of monomers constituting the polymer is from 1.0 $cal^{0.5}/cm^{1.5}$ or more to 1.5 $cal^{0.5}/cm^{1.5}$ or less. The use of the liquid composition thus constituted enables the modified siloxane compound to be present on the recording medium, so that the action of the modified siloxane compound to improve the slipperiness of the coating film surface can fully be brought out to achieve the superior scratch resistance. Incidentally, the reason for settling the polymer A and the polymer B that the lower limit of the hydrogen bond parameter ($\delta h$) of the polymer that is obtained by the solubility parameters of monomers constituting the polymer is 1.0 cal$^{0.5}$/cm$^{1.5}$ or more will be described below.

The present inventors have studied various modified siloxane compounds. As a result, they have discovered that modified siloxane compounds shown below are necessary to be used in order to achieve the scratch resistance aimed in the present invention. Stated specifically, they have discovered that what is most suitable is at least one selected from the group consisting of a modified siloxane compound represented by the following Formula (1), a modified siloxane compound represented by the following Formula (2) and a modified siloxane compound represented by the following Formula (3). These modified siloxane compounds are those which provide the reference evaluation images with a coefficient of dynamic friction of 0.40 or less as obtained by the test method described above when the liquid composition further containing the polymer and a pigment ink are used in combination to form images on, for example, the recording medium having a coat layer. Incidentally, the coefficient of dynamic friction of the reference evaluation images is the value obtained according to the above method.

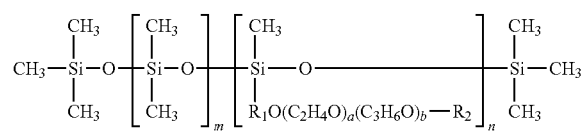

Formula (1)

where the modified siloxane compound represented by Formula (1) has a weight average molecular weight of from 8,000 or more to 30,000 or less; in Formula (1), $R_1$ is an alkylene group having 1 to 20 carbon atom(s), $R_2$ is a hydrogen atom or an alkyl group having 1 to 20 carbon atom(s), m is from 1 or more to 250 or less, n is from 1 or more to 100 or less, a is from 1 or more to 100 or less, and b is from 0 or more to 100 or less.

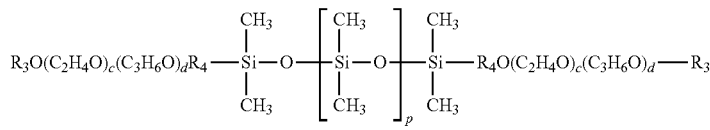

Formula (2)

where the modified siloxane compound represented by Formula (2) has a weight average molecular weight of from 8,000 or more to less than 50,000; in Formula (2), $R_3$'s are each independently a hydrogen atom or an alkyl group having 1 to 20 carbon atom(s), $R_4$'s are each independently an alkylene group having 1 to 20 carbon atom(s), p is from 1 or more to 450 or less, c is from 1 or more to 250 or less, and d is from 0 or more to 100 or less.

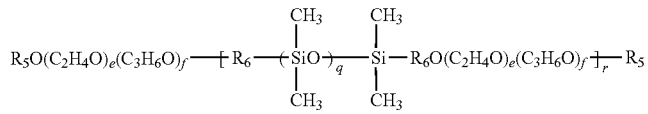

Formula (3)

where the modified siloxane compound represented by Formula (3) has a weight average molecular weight of from 8,000 or more to less than 50,000 and an HLB of from 1 or more to less than 7; in Formula (3), $R_5$'s are each independently a hydrogen atom or an alkyl group 1 to 20 carbon atom(s), $R_6$ is an alkylene group having 1 to 20 carbon atom(s), q is from 1 or more to 100 or less, r is from 1 or more to 100 or less, e is from 1 or more to 100 or less, and f is from 0 or more to 100 or less.

The foregoing results mean that the optimum effect of the present invention can not necessarily be obtained in some cases even in the case of modified siloxane compounds having the effect of improving the slipperiness of coating film surfaces. That is, when images are formed using an ink and, e.g., a liquid composition containing a modified siloxane compound having the value of weight average molecular weight outside the above range, the properties the modified siloxane compound originally has can not sufficiently be obtained in some cases. The reason therefor is not clear, but is presumed to be as follows: As the mechanism by which the object of the present invention is achieved, the polymer is considered to adsorb the modified siloxane compound (or vice versa), as stated previously. However, where, e.g., the modified siloxane compound represented by the above Formula (1) has a weight average molecular weight of more than 30,000, it is considered to be difficult for the polymer to adsorb the modified siloxane compound (or vice versa) in some cases because of an influence of steric hindrance or the like. Where, e.g., the modified siloxane compound represented by the above Formula (2) or (3) has a weight average molecular weight of 50,000 or more, too, it is considered to be difficult for the polymer to adsorb the modified siloxane compound (or vice versa) in some cases because of an influence of steric hindrance or the like. As a result, it is presumable that such a modified siloxane compound may penetrate into the recording medium, so that the coefficient of dynamic friction of images can not be lowered in some cases. Where on the other hand the modified siloxane compound represented by any one of the above Formulas (1), (2) and (3) has a weight average molecular weight of less than 8,000, it is presumable that the modified siloxane compound to be provided over the surfaces of images may be in so small quantity that the coefficient of dynamic friction of images can not be lowered in some cases; or where the modified siloxane compound has a weight average molecular weight of less than 8,000, it is presumable that the modified siloxane compound itself may penetrate into the recording medium, so that the scratch resistance of images can not be lowered in some cases.

Hereinafter, the "hydrogen bond parameter (δh) of polymer that is obtained by the solubility parameters of monomers constituting the polymer", as used in the present invention, will be explained. First, the solubility parameter will be explained. The solubility parameter is affected by a functional group kind of the compound. The solubility parameter is one of the factors determining a solubility of plural compounds or an affinity of the compounds with each other, and when the solubility parameters of these compounds are similar to each other, the solubility of them is tend to become higher. The solubility parameter is classified into a dispersion force parameter ($\delta d$) resulting from the primary deviation of an electron distribution, a polarity parameter ($\delta p$) resulting from an attractive or repulsive force generated by a dipolar moment, and a hydrogen bond parameter ($\delta h$) resulting from a hydrogen bond generated by active hydrogens or a lone pair of electrons. In the present invention, the hydrogen bond parameter is applied to a polymer, and as the hydrogen bond parameter of the polymer is large, the affinity of the polymer and water become stronger. The hydrogen bond parameter ($\delta h$) of the polymer can be determined by the solubility parameters of a monomer constituting the polymer. Then, the hydrogen bond parameter ($\delta h$) of the polymer obtained by the solubility parameter of a monomer constituting the polymer can be determined by an atomic group summation method proposed by Krevelen in which organic molecules are treated as atomic groups (see Krevelen, Properties of Polymer 2nd Edition, New York, 154 (1976)). This method is described below. First, the dispersion force parameter ($\delta d$), polarity parameter ($\delta p$), and hydrogen bond parameter ($\delta h$) of the solubility parameter are determined from a dispersion force parameter Fdi per mole, a polarity force parameter Fpi per mole, and a hydrogen bond force parameter Phi per mole of each atomic group in the organic molecules. The solubility parameter ($\delta$) can be determined by using those values as shown in the following equations:

$$\delta d = (\Sigma F d i)/V.$$

$$\delta p = (\Sigma F p i)/V.$$

$$\delta h = (\Sigma F h i)/V.$$

$$\delta = (\delta d^2 + \delta p^2 + \delta h^2)^{1/2}.$$

(V is the sum of molar volumes of atomic groups.)

The present inventors have come to a finding that, as to a polymer incorporated in the liquid composition, whether the polymer penetrates into a recording medium together with an aqueous medium or remains on the recording medium to become fixed there may be judged by taking account of the hydrogen bond parameter ($\delta h$) that contributes to the solubility parameter ($\delta$). The relationship between the hydrogen bond parameter ($\delta h$) that contributes to the solubility parameter ($\delta$) and the degree of penetration of polymer into the recording medium is not clear, but the present inventors presume it as follows: The hydrogen bond parameter ($\delta h$) comes from hydrogen bonds, and there is a tendency that the affinity of the polymer for the water increases with an increase in the hydrogen bond parameter ($\delta h$) of the polymer. A liquid composition chiefly containing an aqueous medium as in the liquid composition of the present invention has a tendency that, with an increase in the hydrogen bond parameter ($\delta h$), the polymer becomes more hydrated and the agglomerative properties between polymers become lower. With this tendency, the polymer is increasingly apt to penetrate into the recording medium without agglomerating on the recording medium, so that the proportion of the polymer remaining on the recording medium tends to lower.

According to studies made by the present inventors, it is preferable that the polymer A and/or the polymer B, having the value(s) of the hydrogen bond parameter ($\delta h$) of polymer that is obtained by the solubility parameters of monomers described later, constituting the polymer, is/are used as the constituent of the liquid composition, which value(s) may differ in its preferable range depending on the acid value of the polymer. More specifically, between the polymer (polymer A) having an acid value of from 90 mgKOH/g or more to 150 mgKOH/g or less and the polymer (polymer B) having an acid value of from more than 150 mgKOH/g to 200 mgKOH/g or less, the preferable range of the hydrogen bond parameter ($\delta h$) may differ as shown below. In the case of the polymer A having the acid value within the above range, the value of the hydrogen bond parameter ($\delta h$) of polymer that is obtained by the solubility parameters of monomers constituting the polymer may preferably be from $1.0 \text{ cal}^{0.5}/\text{cm}^{1.5}$ or more to $3.7 \text{ cal}^{0.5}/\text{cm}^{1.5}$ or less. In the case of the polymer B, the value of the hydrogen bond parameter ($\delta h$) of polymer that is obtained by the solubility parameters of monomers constituting the polymer may preferably be from $1.0 \text{ cal}^{0.5}/\text{cm}^{1.5}$ or more to $1.5 \text{ cal}^{0.5}/\text{cm}^{1.5}$ or less. Thus, the polymer that can achieve the effect of the present invention can accurately be selected.

Liquid Composition

The respective constituents making up the liquid composition of the present invention are described below. The liquid composition of the present invention may preferably be substantially colorless or lightly colored. Here, "substantially colorless or lightly colored" means that the image density substantially does not lower when the liquid composition is applied to regions which include images formed using an ink. Stated more specifically, it is preferable for the liquid composition not to have any maximum absorption wavelength in the visible range of from 400 nm to 700 nm. The liquid composition fulfilling such conditions may stand somewhat cloudy. It is also preferable that the difference between the image density of images to which the liquid composition has been applied and the image density of images to which the same is not applied is so controlled as to be 0.3 or less, and more preferably 0.1 or less. The liquid composition according to the present invention can satisfy the above property by, for example, no coloring material is contained in the liquid composition.

Modified Siloxane Compound

The modified siloxane compound used in the liquid composition of the present invention is at least one selected from the group consisting of the modified siloxane compound represented by the following Formula (1), the modified siloxane compound represented by the following Formula (2) and the modified siloxane compound represented by the following Formula (3).

In these modified siloxane compounds represented by the following Formulas (1), (2) and (3), ($C_2H_4O$) and ($C_3H_6O$) represent an ethylene oxide unit and a propylene oxide unit, respectively. In each modified siloxane compound, the ethylene oxide unit and the propylene oxide unit in the structure of the compound may be present in any state such as a random form or a block form. In the present invention, these units are preferably present in a random form or a block form. That these units are present in the state of a random form means that the ethylene oxide unit and the propylene oxide unit are irregularly arranged. That these units are present in the state of a block form means that the respective blocks are each made up of some units and the blocks thus made up are regularly arranged.

Modified siloxane compound represented by Formula (1)

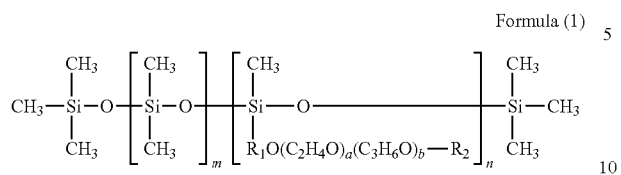

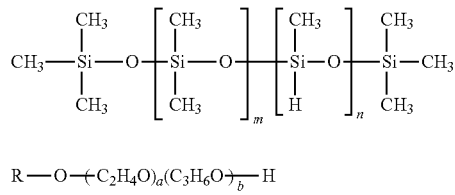

Modified siloxane compound represented by Formula (2)

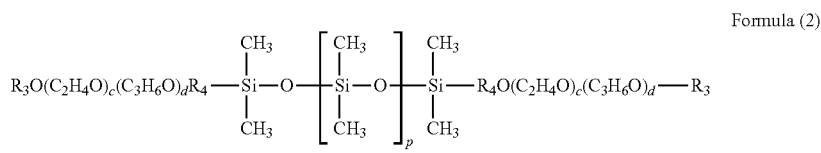

where the modified siloxane compound represented by Formula (1) has a weight average molecular weight of from 8,000 or more to 30,000 or less; in Formula (1), $R_1$ is an alkylene group having 1 to 20 carbon atom(s), $R_2$ is a hydrogen atom or an alkyl group having 1 to 20 carbon atom(s), m is from 1 or more to 250 or less, n is from 1 or more to 100 or less, a is from 1 or more to 100 or less, and b is from 0 or more to 100 or less.

$R_1$ may preferably be an alkylene group having 1 to 10 carbon atom(s), and further, particularly preferably be an ethylene group, a propylene group or a butylene group. $R_2$ may preferably be an alkyl group having 1 to 10 carbon atom(s), and further, particularly preferably be an ethyl group or a propyl group. Letter symbol m is preferably from 1 or more to 250 or less, more preferably from 1 or more to 100 or less, and particularly preferably from 1 or more to 50 or less. Letter symbol n is preferably from 1 or more to 100 or less, and more preferably from 1 or more to 50 or less. Letter symbol a is preferably from 1 or more to 100 or less, and more preferably from 1 or more to 50 or less. Letter symbol b is preferably from 0 or more to 100 or less, and more preferably from 1 or more to 50 or less.

The compound represented by above Formula (1) used in the present invention is obtained by the additive polymerization of two kinds of compounds represented by the following formulas. Namely, the compound is obtained by the additive reaction of polysiloxane having n unit(s) of hydrogen atom(s) bonded to n unit(s) of Si and compounds of a structure having ethylene oxide unit(s) and/or propylene oxide unit(s) and an alkene group on the terminal of the compound. Specifically, the compound is obtained by the addition of the hydrogen atom of the polysiloxane with the alkene group. In the following Formulae, m is from 1 or more to 250 or less, n is from 1 or more to 100 or less, a is from 1 or more to 100 or less, b is from 0 or more to 100 or less and R is an alkene group having 1 to 20 carbon atom(s).

where the modified siloxane compound represented by Formula (2) has a weight average molecular weight of from 8,000 or more to less than 50,000; in Formula (2), $R_3$'s are each independently a hydrogen atom or an alkyl group having 1 to 20 carbon atom(s), $R_4$'s are each independently an alkylene group having 1 to 20 carbon atom(s), p is from 1 or more to 450 or less, c is from 1 or more to 250 or less, and d is from 0 or more to 100 or less.

$R_3$'s are each preferably a hydrogen atom or an alkyl group having 1 to 10 carbon atom(s), and more preferably a hydrogen atom, an ethyl group or a propyl group. $R_4$'s are each preferably an alkylene group having 1 to 10 carbon atom(s), and further, particularly preferably an ethylene group, a propylene group or a butylene group. Letter symbol p is preferably from 1 or more to 450 or less, more preferably from 1 or more to 100 or less, and particularly preferably from 1 or more to 50 or less.

The compound represented by above Formula (2) used in the present invention is obtained by the additive polymerization of two kinds of compounds represented by the following formulas. Namely, the compound is obtained by the additive reaction of polysiloxane having hydrogen atoms bonded to Si on both terminals and compounds of a structure having ethylene oxide unit(s) and/or propylene oxide unit(s) and an alkene group on the terminal of the compound. Specifically, the compound is obtained by the addition of the hydrogen atom of the polysiloxane with the alkene group. In the following Formulae, p is from 1 or more to 450 or less, c is from 1 or more to 250 or less, d is from 0 or more to 100 or less and R is an alkene group having 1 to 20 carbon atom(s).

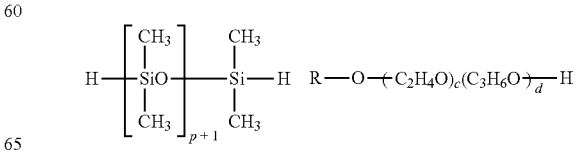

Modified siloxane compound represented by Formula (3)

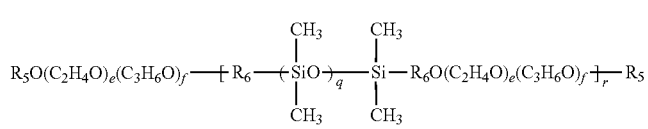

Formula (3)

where the modified siloxane compound represented by Formula (3) has a weight average molecular weight of from 8,000 or more to less than 50,000 and an HLB of from 1 or more to less than 7; in Formula (3), $R_5$'s are each independently a hydrogen atom or an alkyl group having 1 to 20 carbon atom(s), $R_6$ is an alkylene group having 1 to 20 carbon atom(s), q is from 1 or more to 100 or less, r is from 1 or more to 100 or less, e is from 1 or more to 100 or less, and f is from 0 or more to 100 or less.

$R_5$'s are each preferably a hydrogen atom or an alkyl group having 1 to 10 carbon atom(s), and more preferably a hydrogen atom, an ethyl group or a propyl group. $R_6$'s are each preferably an alkylene group having 1 to 10 carbon atom(s), and further, particularly preferably an ethylene group, a propylene group or a butylene group. Letter symbol e is preferably from 1 or more to 100 or less, and more preferably from 1 or more to 50 or less. Letter symbol f is preferably from 1 or more to 100 or less, and more preferably from 1 or more to 50 or less.

The compound represented by above Formula (3) used in the present invention is obtained by the additive polymerization of two kinds of compounds represented by the following formulas. Namely, the compound is obtained by the additive reaction of polysiloxane having hydrogen atoms bonded to Si on both terminals and compounds of a structure having ethylene oxide unit(s) and/or propylene oxide unit(s) and alkene groups on both terminals of the compound. Specifically, the compound is obtained by the addition of the hydrogen atom of the polysiloxane with the alkene group. In the following Formulae, q is from 1 or more to 100 or less, r is from 1 or more to 100 or less, e is from 1 or more to 100 or less, f is from 0 or more to 100 or less and R is an alkene group having 1 to 20 carbon atom(s).

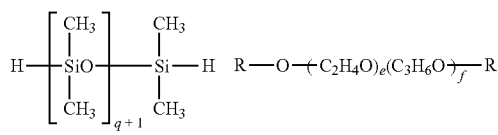

As at least one modified siloxane compound selected from the group consisting of the modified siloxane compounds represented by the above Formulas (1), (2) and (3), any compound may be used as long as the images are obtainable which have the high-level scratch resistance as aimed in the present invention. However, studies made by the present inventors have revealed that it is particularly preferable to use modified siloxane compounds having the following weight average molecular weights. Stated specifically, in the case of the modified siloxane compound represented by the above Formula (1), it may preferably have a weight average molecular weight (Mw) of from 8,000 or more to 30,000 or less, and further, particularly preferably from 8,500 or more to 30,000 or less. In the case of the modified siloxane compound represented by the above Formula (2) or (3), it may preferably have a weight average molecular weight (Mw) of from 8,000 or more to less than 50,000, and further, particularly preferably from 8,500 or more to 30,000 or less. Here, the weight average molecular weight (Mw) is weight average molecular weight in terms of polystyrene, in molecular weight distribution as measured by gel permeation chromatography (GPC). Incidentally, the modified siloxane compounds used in the present invention are synthesized as described above, since the compounds having alkene group(s) as well as polysilixanes used as raw materials are mixture compounds having molecular weight ranges, the molecular weight of the compounds are obtained as average molecular weights.

Studies made by the present inventors have revealed that, of the modified siloxane compound represented by the above Formula (1), it is preferable to use a modified siloxane compound having a specific HLB (hydrophilic-lipophilic balance; the value calculated by the Griffin method). More specifically, the modified siloxane compound represented by the above Formula (1) may preferably have an HLB of from 1 or more to 11 or less, and more preferably from 5 or more to 11 or less.

Where the modified siloxane compound represented by the above Formula (1) is used in the liquid composition of the present invention, setting its weight average molecular weight and also its HLB within the above ranges reduces the modified siloxane compound penetrating into the recording medium when the liquid composition is applied onto the recording medium. As a result, the modified siloxane compound represented by the above Formula (1) is apt to remain on the recording medium. Hence, even where the modified siloxane compound represented by the above Formula (1) is in a small content in the liquid composition, the coefficient of dynamic friction of images can effectively be lowered. Such a modified siloxane compound represented by the above Formula (1) that fulfills the above conditions and is preferably usable in the present invention may include the following: e.g., FZ-2104, FZ-2130 and FZ-2191 (all available from Dow Corning Toray Silicone Co., Ltd.), KF-615R (available from Shin-Etsu Chemical Co., Ltd.), TSF4452 (available from GE Toshiba Silicone Co., Ltd.). Of course, in the present invention, examples are by no means limited to these.

Where the modified siloxane compound represented by the above Formula (2) is used in the liquid composition of the present invention, setting its weight average molecular weight within the above range reduces the modified siloxane compound penetrating into the recording medium when the liquid composition is applied onto the recording medium. As a result, the modified siloxane compound represented by the above Formula (2) is apt to remain on the recording medium. Hence, even where the modified siloxane compound represented by the above Formula (2) is in a small content in the liquid composition, the coefficient of dynamic friction of images can effectively be lowered. Such a modified siloxane compound represented by the above Formula (2) that fulfills the above conditions and is preferably usable in the present invention may include, e.g., BYK333 (available from Byk Chemie Japan KK). Of course, in the present invention, examples are by no means limited to this.

Studies made by the present inventors have revealed that, of the modified siloxane compound represented by the above Formula (3), it is preferable to use a modified siloxane compound having a specific HLB (hydrophilic-lipophilic balance; the value calculated by the Griffin method). More specifically, the modified siloxane compound represented by the above Formula (3) necessarily has an HLB of from 1 or more to less than 7.

Where the modified siloxane compound represented by the above Formula (3) is used in the liquid composition of the present invention, setting its weight average molecular weight and also its HLB within the above ranges reduces the modified siloxane compound penetrating into the recording medium when the liquid composition is applied onto the recording medium. As a result, the modified siloxane compound represented by the above Formula (3) is apt to remain on the recording medium. Hence, even where the modified siloxane compound represented by the above Formula (3) is in a small content in the liquid composition, the coefficient of dynamic friction of images can effectively be lowered. Such a modified siloxane compound represented by the above Formula (1) that fulfills the above conditions and is preferably usable in the present invention may include the following; e.g., FZ-2203, FZ-2207, FZ-2222 and FZ-2231 (all available from Dow Corning Toray Silicone Co., Ltd.). Of course, in the present invention, examples are by no means limited to these.

As described previously, the weight average molecular weight (Mw) of the modified siloxane compound may be measured by gel permeation chromatography (GPC), using tetrahydrofuran as a mobile phase. A measuring method used in the present invention is as shown below. Measuring conditions such as a filter, a column, a standard polystyrene sample and its molecular weight are by no means limited to the following.

First, a sample for measurement is put in tetrahydrofuran (THF) and left standing for several hours to dissolve to prepare a solution. Thereafter, the solution is filtered with a solvent-resistant membrane filter of 0.45 μm in pore size (e.g.; trade name: TITAN 2 Syringe Filter, PTFE, 0.45 μm; available from SUN-SRi). The concentration of the sample in the sample solution is so controlled that the content of the modified siloxane compound may be from 0.1% by mass to 0.5% by mass.

In the GPC, an RI detector (refractive index detector) is used. In order to accurately measure molecular weight within the range of from 1,000 to 2,000,000, it is preferable to use a plurality of commercially available polystyrene gel columns in combination. For example, four columns of Shodex KF-806M (available from Showa Denko K.K.) may be used in combination, or something corresponding thereto may be used. THF as a mobile phase is flowed at a flow rate of 1 mL/min to columns having been stabilized in a 40.0° C. heat chamber, and the above sample solution is injected in an amount of about 0.1 mL.

The weight average molecular weight of the sample is determined by using a molecular weight calibration curve having been prepared using the standard polystyrene sample. One having a molecular weight of from about 100 to about 10,000,000 (e.g., one available from Polymer Laboratories Inc.) may be used as the standard polystyrene sample, and it is suitable to use at least about 10 types of standard polystyrene samples.

The content (% by mass) of the modified siloxane compound in the liquid composition is preferably from 0.2% by mass or more to 5.0% by mass or less, and more preferably from 0.5% by mass or more to less than 3.0% by mass, based on the total mass of the liquid composition. In particular, when the modified siloxane compound represented by the above Formula (2) is used, the content (% by mass) of the modified siloxane compound in the liquid composition is preferably from 1.0% by mass or more to less than 3.0% by mass. Where the content of the modified siloxane compound from 0.5% by mass or more, the modified siloxane compound can satisfactorily be left on the recording medium to provide images with an especially superior scratch resistance. In addition, where the content of the modified siloxane compound is less than 3.0% by mass, the occurrence of faulty ejection due to, e.g., kogation may be minimized, which is particularly preferable.

Polymer

As the polymer used in the liquid composition of the present invention, as stated previously any polymer may be used as long as it is a polymer which can remain on the recording medium after the liquid composition has been applied onto the recording medium, to form a film having strength to a certain extent. However, studies made by the present inventors have revealed that, in order to suppress an ejection orifice wetting phenomenon due to the polymer, which phenomenon may come into question particularly when the liquid composition is used for ink jet recording, it is most suitable to use at least one of the polymer A and the polymer B each having the properties as described previously.

The "hydrogen bond parameter (δh) of polymer that is obtained by the solubility parameters of monomers constituting the polymer", as used in the present invention, is a value found in the following way. First, the hydrogen bond parameter (δh) of each monomer constituting the polymer is obtained by the solubility parameter inherent in each monomer constituting the polymer. Then, the hydrogen bond parameter (δh) of each monomer constituting the polymer obtained above is multiplied by the compositional (mass) ratio of each monomer constituting the polymer (compositional ratio when the sum total is defined as 1) to find respective values. Next, the values obtained may be summed up to find the hydrogen bond parameter (δh) of the polymer.

If the polymer making up the liquid composition of the present invention has an acid value of less than 90 mgKOH/g, the polymer may be unable to be dissolved in an alkali, or the polymer may be precipitated when the liquid composition is stored over a long period of time. Further, if it has an acid value of less than 90 mgKOH/g, it may be difficult to maintain stable ejection property when the liquid composition is incorporated therein with the polymer in an amount large enough to achieve the scratch resistance as aimed in the present invention and such a liquid composition is ejected by means of a thermal-type ink jet recording system. Hence, it is preferable for the polymer to have an acid value of 90 mgKOH/g or more. On the other hand the polymer has an acid value of more than 150 mgKOH/g, the polymer may tend to penetrate into the recording medium together with an aqueous medium contained in the liquid composition, so that the high-level scratch resistance as aimed in the present invention can not be obtained in some cases. Accordingly, when the polymer has an acid value of more than 150 mgKOH/g, it is preferable that the hydrogen bond parameter (δh) of polymer that is obtained by the solubility parameters of monomers constituting the polymer is 1.5 cal$^{0.5}$/cm$^{1.5}$ or less. However, when the polymer has an acid value of more than 200 mgKOH/g, even though the hydrogen bond parameter (δh) is controlled in any manner, the polymer can not be left, in some cases, on the recording medium in an amount large enough to achieve the high-level scratch resistance at which the present invention is aimed. Hence, it is preferable that the polymer has an acid value of 200 mgKOH/g or less.

Further, the polymer A or polymer B making up the liquid composition of the present invention may remarkably cause the ejection orifice wetting phenomenon due to the polymer, if the hydrogen bond parameter (δh) of polymer that is obtained by the solubility parameters of monomers constituting the polymer is less than $1.0 \, cal^{0.5}/cm^{1.5}$. As a result, for example, curved flying of liquid droplets may occur to cause deterioration of ejection property. Hence, the hydrogen bond parameter (δh) of polymer that is obtained by the solubility parameters of monomers constituting the polymer A or polymer B is preferably $1.0 \, cal^{0.5}/cm^{1.5}$ or more. On the other hand, when the hydrogen bond parameter (δh) of polymer that is obtained by the solubility parameters of monomers constituting the polymer is more than $3.7 \, cal^{0.5}/cm^{1.5}$, even though the acid value of the polymer is controlled in any manner, the polymer may be liable to penetrate into the recording medium together with an aqueous medium contained in the liquid composition. Hence, the scratch resistance as aimed in the present invention can not be obtained in some cases.

To summarize these, it is most suitable for at least one polymer selected from the polymer A and the polymer B, making up the liquid composition of the present invention, to have such properties that the acid value and hydrogen bond parameter (δh) as specified below are in combination.

The polymer A has an acid value of from 90 mgKOH/g or more to 150 mgKOH/g or less. In the polymer A, in addition to the above acid value, the hydrogen bond parameter (δh) of polymer that is obtained by the solubility parameters of monomers constituting the polymer is from $1.0 \, cal^{0.5}/cm^{1.5}$ or more to $3.7 \, cal^{0.5}/cm^{1.5}$ or less. Further, in the polymer A, the hydrogen bond parameter (δh) of polymer that is obtained by the solubility parameters of monomers constituting the polymer is more preferably from $1.0 \, cal^{0.5}/cm^{1.5}$ or more to $3.2 \, cal^{0.5}/cm^{1.5}$ or less. In particular, in the polymer A, the hydrogen bond parameter (δh) of polymer that is obtained by the solubility parameters of monomers constituting the A polymer is still further preferably from $1.2 \, cal^{0.5}/cm^{1.5}$ or more to $1.8 \, cal^{0.5}/cm^{1.5}$ or less.

On the other hand, the polymer B has an acid value of from more than 150 mgKOH/g to 200 mgKOH/g or less. In the polymer B, in addition to the above acid value, the hydrogen bond parameter (δh) of polymer that is obtained by the solubility parameters of monomers constituting the polymer is from $1.0 \, cal^{0.5}/cm^{1.5}$ or more to $1.5 \, cal^{0.5}/cm^{1.5}$ or less. Further, in the polymer B, the hydrogen bond parameter (δh) of polymer that is obtained by the solubility parameters of monomers constituting the polymer is more preferably from $1.2 \, cal^{0.5}/cm^{1.5}$ or more to $1.5 \, cal^{0.5}/cm^{1.5}$ or less.

As the monomer(s) making up the polymer used in the liquid composition of the present invention, any monomer may be used as long as it can provide the polymer having as its properties the acid value and the hydrogen bond parameter (δh) of polymer that is obtained by the solubility parameters of monomers constituting the polymer, as described above. Stated specifically, any of monomers enumerated below may be used as the monomer making up the polymer.

Styrene, and α-methylstyrene; ethyl acrylate, n-butyl acrylate, n-hexyl acrylate, methyl methacrylate, and benzyl methacrylate; monomers having a carboxyl group, such as acrylic acid, methacrylic acid, crotonic acid, ethacrylic acid, propylacrylic acid, isopropylacrylic acid, itaconic acid, and fumaric acid; monomers having a sulfonic acid group, such as styrene sulfonic acid, sulfonic acid-2-propyl acrylamide, acrylic acid-2-ethyl sulfonate, methacrylic acid-2-ethyl sulfonate, and butyl acrylamide sulfonic acid; and monomers having a phosphonic acid group, such as methacrylic acid-2-ethyl phosphonate, and acrylic acid-2-ethyl phosphonate.

In the present invention, in the case when the polymer A is used, it may preferably contain, among the monomers enumerated above, at least one monomer selected from the group consisting of styrene, n-butyl acrylate and benzyl methacrylate. Further, the monomer(s) making up the polymer A may more preferably have both styrene and n-butyl acrylate. In the monomers making up the polymer A, the mass ratio of n-butyl acrylate to styrene (n-butyl acrylate/styrene) is particularly preferably from more than 0.2 to less than 0.35. In the case when the polymer B is used, it may preferably contain, among the monomers enumerated above, at least one monomer selected from the group consisting of styrene and α-methylstyrene. Further, the monomer(s) making up the polymer B may more preferably have both styrene and α-methylstyrene. In the monomers making up the polymer B, the mass ratio of α-methylstyrene to styrene (α-methylstyrene/styrene) may particularly preferably be 0.90 or less. In the present invention, it is not so desirable to use a monomer having a nonionic group, such as ethylene oxide, because the strength of film formed on the recording medium may be lessened.

The polymer (at least one polymer selected from the polymer A and the polymer B) may preferably have a weight average molecular weight of from 5,000 or more to 15,000 or less, and more preferably from 6,000 or more to 9,000 or less. The polymer having weight average molecular weight within the above range can easily remain on the recording medium after the liquid composition has been applied onto the recording medium, and further can not easily be affected by steric hindrance. Hence, the polymer can easily adsorb the modified siloxane compound, so that the coefficient of dynamic friction of images can effectively be lowered.

The content (% by mass) of the polymer (at least one polymer selected from the polymer A and the polymer B) in the liquid composition is preferably from 0.5% by mass or more to 5.0% by mass or less, and more preferably from 2.5% by mass or more to 4.0% by mass or less, based on the total mass of the liquid composition. Inasmuch as the polymer is in the content within the above range, the polymer can be left on the recording medium in such an amount that the scratch resistance of images can satisfactorily be achieved. Further, inasmuch as the polymer is in the content within the above range, the ejection orifice wetting phenomenon due to the polymer can be suppressed and deterioration of ejection property, such as curved flying of liquid droplets, is not easily brought about.

Aqueous Medium

In the liquid composition of the present invention, an aqueous medium may be used which is water or a mixed solvent of water and a water-soluble organic solvent. The content (% by mass) of the water-soluble organic solvent in the liquid composition is preferably from 3.0% by mass or more to 50.0% by mass or less based on the total mass of the liquid composition.

There are no particular limitations on the water-soluble organic solvent as long as it is water-soluble. Any of those as enumerated below may be used alone or in combination of two or more types Stated specifically, the following water-soluble organic solvents may be used, for example: Alkanediols such as 1,3-butanediol, 1,5-pentanediol, 1,2-hexanediol and 1,6-hexanediol; glycol ethers such as diethylene glycol monomethyl(or -ethyl)ether and triethylene glycol monoethyl(or -butyl)ether; alkyl alcohols having 1 to 4 carbon atoms, such as ethanol, isopropanol, n-butanol, isobutanol, secondary butanol and tertiary butanol; carboxylic acid amides such as N,N-dimethyl formamide and N,N-dimethyl acetamide; ketones or ketoalcohols such as acetoner methyl ethyl ketone and 2-methyl-2-hydroxypentan-4-one; cyclic ethers such as tetrahydrofuran and dioxane; glycerol; ethylene glycols such as ethylene glycol, diethylene glycol, triethylene glycol and tetraethylene glycol; polyethylene glycols having an average molecular weight of from 200 to 1,000, such as 1,2- or 1,3-propylene glycol and 1,2- or 1,4-butylene glycol; glycols such as thiodiglycol, 1,2,6-hexanetriol, and acetylene glycol derivatives; heterocyclic rings such as 2-pyrrolidone, N-methyl-2-pyrrolidone, 1,3-dimethyl-2-imidazolidinone and N-methylmorpholine; and sulfur-containing compounds such as dimethyl sulfoxide.

As the water, it is preferable to use deionized water (ion-exchange water). The content (% by mass) of the water in the liquid composition is preferably from 50.0% by mass or more to 95.0% by mass or less based on the total mass of the liquid composition.

Other Components

Besides the components described above, the liquid composition of the present invention may contain a moisture-retentive solid matter such as urea, a urea derivative, trimethylolpropane or trimethylolethane. The content (% by mass) of the moisture-retentive solid matter in the liquid composition is preferably from 0.1% by mass or more to 20.0% by mass or less, and more preferably from 3.0% by mass or more to 10.0% by mass or less, based on the total mass of the liquid composition.

In order to cause the liquid composition to have any desired values of physical properties as needed, the liquid composition may further contain various additives such as a pH adjuster, a rust preventive, an antiseptic agent, a mildew-proofing agent, an antioxidant and a reduction-preventive agent.

Pigment Ink

Components making up the pigment ink used together with the above liquid composition of the present invention in the image forming method and the like are described below.

Pigment

In the ink, it is possible to use pigments of a polymer dispersion type (polymer dispersion type pigments) which use a dispersing agent to disperse the pigment, and pigments of a self-dispersion type (self-dispersion type pigments), in which hydrophilic groups have been introduced into the pigment particle surface portions. Also it is possible to use pigments having organic groups containing a polymer which are chemically bonded to the pigment particle surfaces (polymer-bonded self dispersion type pigments), and microcapsule type pigments whose dispersibility is improved so as to be render them dispersible without using any dispersing agent. Of course, these pigments different in the manner of dispersion may be used in combination. The content (% by mass) of the pigment in the ink is preferably from 0.1% by mass or more to 15.0% by mass or less, and more preferably from 1.0% by mass or more to 10.0% by mass or less, based on the total mass of the ink.

It is preferable to use, as a pigment for a black ink, carbon black such as furnace black, lamp black, acetylene black or channel black. Stated specifically, the following commercially available products may be used, for example:

RAVEN: 1170, 1190 ULTRA-II, 1200, 1250, 1255, 1500, 2000, 3500, 5000 ULTRA, 5250, 5750 and 700 (all available from Columbian Carbon Japan Limited); BLACK PEARLS L, REGAL: 330R, 40CR and 660R, MOGUL L, MONARCH: 700, 800, 880, 900, 1000, 1100, 1300, 1400 and 2000, and VALCAN XC-72 (all available from Cabot Corp.); COLOR BLACK: FW1, FW2, FW2V, FW18, FW200, S150, S160 and S100, PRINTEX: 35, U, V, 140U and 140V, SPECIAL BLACK: 6, 5, 4A and 4 (all available from Degussa Corp.); and No. 25, No. 33, No. 40, No. 47, No. 52, No. 900, No. 2300, MCE-83, MA600, MA7, MA8, and MA100 (all available from Mitsubishi Chemicals, Inc.).

Carbon black prepared newly may also be used. Of course, in the present invention, examples are by no means limited to these, and any conventionally known carbon black may be used. Without being limited to the carbon black, fine magnetic-material particles of magnetite, ferrite or the like, and titanium black may also be used as the pigment.

In color inks, organic pigments may preferably be used as pigments. Stated specifically, the following may be used, for example:

Water-insoluble azo pigments such as Toluidine Red, Toluidine maroon, Hanza Yellow, Benzidine Yellow and Pyrazolone Red; water-soluble azo pigments such as Lithol Red, Helio Bordeaux, Pigment Scarlet and Permanent Red 2B; derivatives from vat dyes, such as alizarin, indanthrone and Thioindigo maroon; phthalocyanine type pigments such as Phthalocyanine Blue and Phthalocyanine Green; quinacridone type pigments such as Quinacridone Red and Quinacridone Magenta; perylene type pigments such as Perylene Red and Perylene Scarlet; isoindolinone type pigments such as Isoindolinone Yellow and Isoindolinone Orange; imidazolone type pigments such as Benzimidazolone Yellow, Benzimidazolone Orange and Benzimidazolone Red; pyranthrone type pigments such as Pyranthrone Red and Pyranthrone Orange; and indigo type pigments, condensation azo type pigments, thioindigo type pigments, diketopyrrolopyrrole type pigments, Flavanthrone Yellow, Acyl Amide Yellow, Quinophthalone Yellow, Nickel Azo Yellow, Copper Azomethine Yellow, Perinone Orange, Anthrone Orange, Dianthraquinonyl Red, and Dioxazine Violet. Of course, in the present invention, examples are by no means limited to these.

When organic pigments are shown by Color Index (C.I.) Number, the following may be used, for example: C.I. Pigment Yellow: 12, 13, 14, 17, 20, 24, 74, 83, 86, 93, 97, 109, 110, 117, 120, 125, 128, 137, 138, 147, 148, 150, 151, 153, 154, 166, 168, 180, 185, etc.; C.I. Pigment Orange: 16, 36, 43, 51, 55, 59, 61, 71, etc.; C.I. Pigment Red: 9, 48, 49, 52, 53, 57, 97, 122, 123, 149, 168, 175, 176, 177, 180, 192, 215, 216, 217, 220, 223, 224, 226, 227, 228, 238, 240, 254, 255, 272, etc.; C.I. Pigment Violet: 19, 23, 29, 30, 37, 40, 50, etc.; C.I. Pigment Blue: 15, 15:1, 15:3, 15:4, 15:6, 22, 60, 64, etc.; C.I. Pigment Green: 7, 36, etc.; and C.I. Pigment Brown: 23, 25, 26, etc. Of course, in the present invention, examples are by no means limited to these.

Polymer

A polymer may be used in the ink. As the polymer, it may be used as a dispersing agent for dispersing the pigment in the aqueous medium, or may only be added to the ink. As the polymer used here, any polymer may be used. However, in order to achieve the scratch resistance as aimed in the present invention, it is preferable to use a polymer having properties as shown below. That is, it is preferable to use the polymer used in the liquid composition according to the present invention, namely, the polymer which can remain on the recording medium after the liquid composition has been applied onto the recording medium, to form a film having a certain strength. Further, in the case when the liquid composition and the ink are used in combination, it is particularly preferable to uniform the polymers used in these liquid composition and ink. In particular, it is preferable that the polymer used in the liquid composition and that used in the ink are the same, namely, the polymer have the same properties (the same acid value and hydrogen bond parameter ($\delta h$) of polymer that is obtained by the solubility parameters of monomers constituting the polymer). In such cases, the polymer used in the ink can have the same properties as the polymer usable in the liquid composition of the present invention described above.

Monomers making up the polymer may specifically include the following, at least two monomers of which may make up the polymer. Here, at least one of them may preferably be a hydrophilic monomer. The monomers may include styrene, vinyl naphthalene, aliphatic alcohol esters of α,β-ethylenically unsaturated carboxylic acids, acrylic acid, maleic acid, itaconic acid, fumaric acid, vinyl acetate, vinyl pyrrolidone, acrylamide, and derivatives of these. At least one of monomers constituting the polymer may preferably be a hydrophilic monomer. As the form of the polymer, it may include block copolymers, random copolymers, graft copolymers or salts or the like of any of these. Further, natural polymers (resins) such as rosin, shellac and starch may also be used. These polymers are soluble in an aqueous solution in which a base has been dissolved, and are alkali-soluble type polymers.

The content (% by mass) of the polymer in the ink is preferably from 0.5% by mass or more to 5.0% by mass or less based on the total mass of the ink. The polymer may also preferably have a weight average molecular weight of from 1,000 or more to 15,000 or less. Further, the polymer may preferably have an acid value of from 90 mgKOH/g or more to 200 mgKOH/g or less.

Aqueous Medium

In the ink, an aqueous medium may be used which is water or a mixed solvent of water and a water-soluble organic solvent. The content (% by mass) of the water-soluble organic solvent in the ink is preferably from 3.0% by mass or more to 50.0% by mass or less based on the total mass of the ink.

There are no particular limitations on the water-soluble organic solvent as long as it is water-soluble. Any of those as enumerated below may be used alone or in combination of two or more types. Stated specifically, the following water-soluble organic solvents may be used, for example: Alkanediols such as 1,3-butanediol, 1,5-pentanediol, 1,2-hexanediol and 1,6-hexanediol; glycol ethers such as diethylene glycol monomethyl(or -ethyl)ether and triethylene glycol monoethyl(or -butyl)ether; alkyl alcohols having 1 to 4 carbon atoms, such as ethanol, isopropanol, n-butanol, isobutanol, secondary butanol and tertiary butanol; carboxylic acid amides such as N,N-dimethyl formamide and N,N-dimethyl acetamide; ketones or ketoalcohols such as acetone, methyl ethyl ketone and 2-methyl-2-hydroxypentan-4-one; cyclic ethers such as tetrahydrofuran and dioxane; glycerol; ethylene glycols such as ethylene glycol, diethylene glycol, triethylene glycol and tetraethylene glycol; glycols such as 1,2- or 1,3-propylene glycol, 1,2- or 1,4-butylene glycol, polyethylene glycol, thiodiglycol, 1,2,6-hexanetriol, and acetylene glycol derivatives; heterocyclic rings such as 2-pyrrolidone, N-methyl-2-pyrrolidone, 1,3-dimethyl-2-imidazolidinone and N-methylmorpholine; and sulfur-containing compounds such as dimethyl sulfoxide.

As the water, it is preferable to use deionized water (ion-exchange water). The content (% by mass) of the water in the ink is preferably from 50.0% by mass or more to 95.0% by mass or less based on the total mass of the ink.

Other Components

Besides the components described above, the ink may contain a moisture-retentive solid matter such as urea, a urea derivative, trimethylolpropane or trimethylolethane. The content (% by mass) of the moisture-retentive solid matter in the ink is preferably from 0.1% by mass or more to 20.0% by mass or less, and more preferably from 3.0% by mass or more to 10.0% by mass or less, based on the total mass of the ink.

In order to make the ink have any desired values of physical properties as occasion calls, the ink may further contain various additives such as a pH adjuster, a rust preventive, an antiseptic agent, a mildew-proofing agent, an antioxidant and a reduction-preventive agent.

Set of Liquid Composition and Ink

The liquid composition of the present invention can be used in combination with ink(s) as a set of liquid composition and ink.

Image Forming Method

The image forming method of the present invention is characterized by having (i) the step of applying the liquid composition onto a recording medium and (ii) the step of applying the pigment ink onto the recording medium. In particular, the steps (i) and (ii) may preferably be so carried out that the liquid composition and the pigment ink may come into contact with each other on the recording medium. In virtue of such constitution of invention, the scratch resistance of images formed using the ink can be what has achieved the high-level good scratch resistance that coloring materials are hardly scraped off even when images are scratched under application of such a strong pressure as to scratch the recording medium at its non-recorded areas.

When the liquid composition and the pigment ink are applied onto the recording medium, there may be done by, e.g., the following methods or combination of these methods. Stated specifically, available are (a) a method in which the pigment ink is applied after the liquid composition has been applied and (b) a method in which the liquid composition is applied after the pigment ink has been applied. In the present invention, any of these methods may appropriately be selected. However, taking account of what is aimed in the present invention to obtain images having superior scratch resistance of the high level conventionally not achievable, the method (b) may preferably be used. In such a case, there are no particular limitations on the interval for which the ink is applied and thereafter the liquid composition is applied. However, in order to more improve the binding force acting between the polymer in the ink and the polymer in the liquid composition, the interval for applying these may preferably be so determined that the ink and the liquid composition may come into contact with each other in the state of liquids and come mixed together.

As to the amount of the liquid composition to be applied onto the recording medium, there are no particular limitations thereon as long as the effect of the present invention can be obtained. However, taking account of making any beading less occur and of improvement in fixing speed, the amount thereof may preferably be from 20% or more to 50% or less, and more preferably from 25% or more to 50% or less, based on the amount of the ink to be applied. Here, the "beading" refers to a phenomenon described below. It refers to a phenomenon that the ink remains flowable before it comes fixed completely to the recording medium, in the state of which some dots formed of the ink may irregularly move in the plane direction on the surface of the recording medium, where other dots adjoining to such moving dots may form aggregates to cause non-uniformity in image density.

If the liquid composition is applied onto the recording medium at its image areas onlyr a great difference in scratch resistance may come between areas where images have been formed and areas where images have not been formed. Hence, it is particularly preferable for the liquid composition to be applied over areas inclusive of the image areas and also broader areas than those. However, when the liquid composition is applied in the above amount of from 20% or more to 50% or less based on the amount of the ink to be applied, it may be difficult for the liquid composition to be applied over the areas inclusive of the image areas and also broader areas than those. Here, in general, where a liquid having a large surface tension and a liquid having a small surface tension come into contact with each other, the liquid having a large surface tension has the characteristic of moving to the liquid having a small surface tension. Accordingly, in order for the liquid composition to be applied over the areas inclusive of the image areas and also broader areas than those, setting the amount of the liquid composition to be preferably from 20% or more to 50% or less, and more preferably from 25% or more to 50% or less, based on the amount of the ink to be applied, it is preferable to do the following. That is, it is preferable to set the liquid composition having a higher surface tension than the surface tension of the ink. Setting it in this way can make the liquid composition spread over, and beyond, the whole areas to which the ink has been applied, at the time the ink and the liquid composition have come into contact with each other.

In the image forming method of the present invention, the method how to apply the ink or the liquid composition on to the recording medium is not particularly limited, although it is particularly preferable that not only the ink but also the liquid composition are applied onto the recording medium by ink jet method. This is because the liquid composition can accurately be applied to image areas with ease and the amount of the liquid composition to be applied can be controlled with ease as specified above. The amounts of the ink and liquid composition to be applied by ink jet method may be controlled by determining the recording duty and so forth appropriately.

Ink Jet Recording Method

The liquid composition of the present invention may particularly preferably be used in an ink jet recording method in which the ink and the liquid composition are ejected by means of ink jet system and therefore record on a recording medium. The ink jet recording method may include, e.g., a recording method in which mechanical energy is caused a to act on an ink and a liquid composition to eject the ink and the liquid composition, and a recording method in which heat energy is caused to act on an ink and a liquid composition to eject the ink and the liquid composition. In particular, the liquid composition of the present invention may preferably be used in the recording method making use of heat energy.

Cartridge

The cartridge of the present invention has a liquid composition storing portion which stores a liquid composition therein, and is characterized in that the liquid composition stored in the liquid composition storing portion is the above liquid composition of the present invention.

Recording Unit

The recording unit of the present invention is provided with a liquid composition storing portion which stores a liquid composition therein and a recording head which ejects the liquid composition therefrom, and is characterized in that the liquid composition stored in the liquid composition storing portion is the above liquid composition of the present invention. In particular, it may preferably be a recording unit in which the recording head ejects the liquid composition therefrom by making heat energy act on the liquid composition.

Ink Jet Recording Apparatus

The ink jet recording apparatus of the present invention is provided with a liquid composition storing portion which stores a liquid composition therein and a recording head which ejects the liquid composition therefrom, and is characterized in that the liquid composition stored in the liquid composition storing portion is the above liquid composition of the present invention. In particular, it may preferably be an ink jet recording apparatus in which the recording head ejects the liquid composition therefrom by making heat energy act on the liquid composition.

Figure 2:
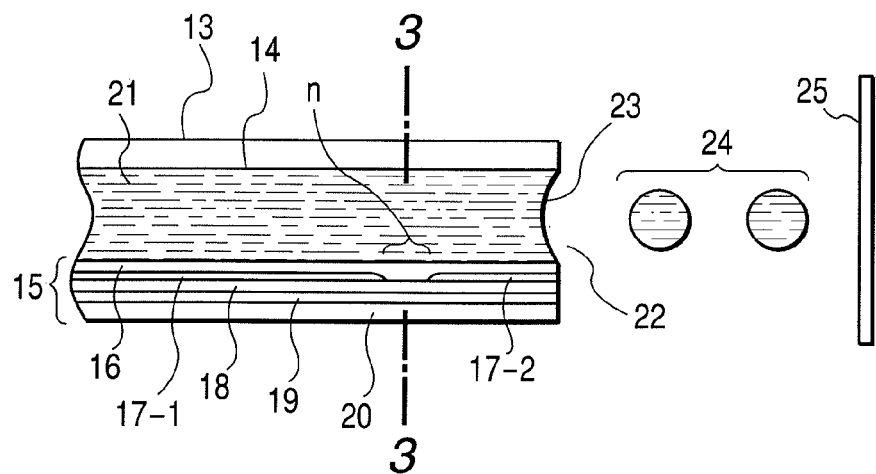
FIG. 2 is a longitudinal sectional view of a recording head.
Figure 3:
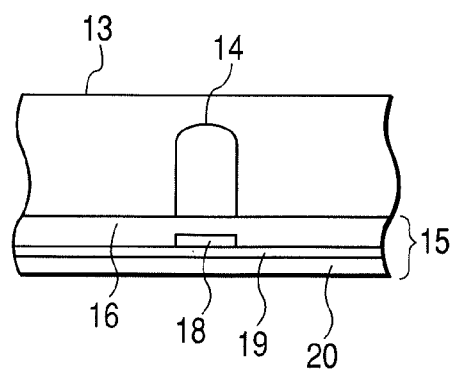
FIG. 3 is a transverse sectional view of the recording head.

An example of the ink jet recording apparatus is described below with reference to the drawings. First, an example of the configuration of the recording head, which is the main part of the ink jet recording apparatus utilizing heat energy, is shown in FIGS. 2 and 3. FIG. 2 is a cross sectional view of a recording head 13 along its ink channel, and FIG. 3 is a cross sectional view taken along the line 3-3 in FIG. 2. The recording head 13 is composed of a member having an ink channel (nozzle) 14, and a heating element substrate member 15. The heating element substrate member 15 is composed of a protective layer 16, electrodes 17-1 and 17-2, a heating resistor layer 18, a heat accumulating layer 19 and a substrate 20.

Upon applying pulsewise electric signals to the electrodes 17-1 and 17-2 of the recording head 13, heat is abruptly generated at the region denoted by n in the heating element substrate member 15, so that bubbles are generated in ink 21 in contact with the surface of this region. Then, the pressure of the bubbles thrusts out a meniscus 23 and the ink 21 is ejected from an ejection orifice 22 of the nozzle 14 in the form of ink droplets 24 to fly toward a recording medium 25.

Figure 4:
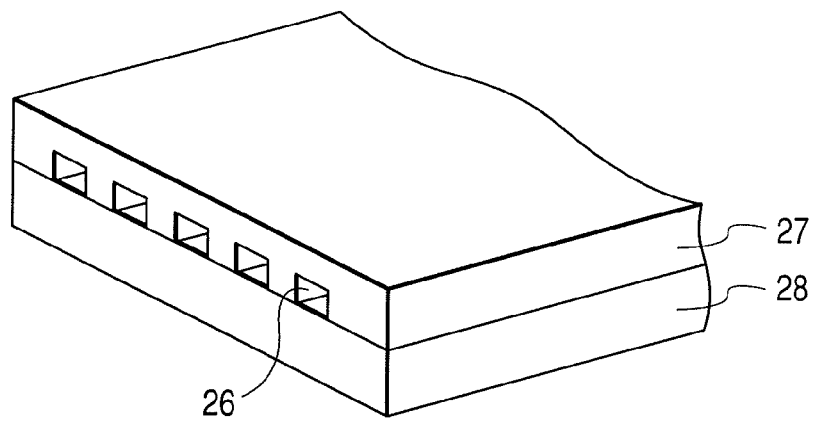
FIG. 4 is a perspective view of a recording head in which multiple recording heads each of which is the recording head as shown in FIG. 2 are set.

FIG. 4 illustrates the external appearance of an example of a multi-head in which multiple recording heads each of which is the recording head as shown in FIG. 2 are arranged. The multi-head is composed of a glass plate 27 having a multi-nozzle 26, and a recording head similar to what is illustrated in FIG. 2.

Figure 5:
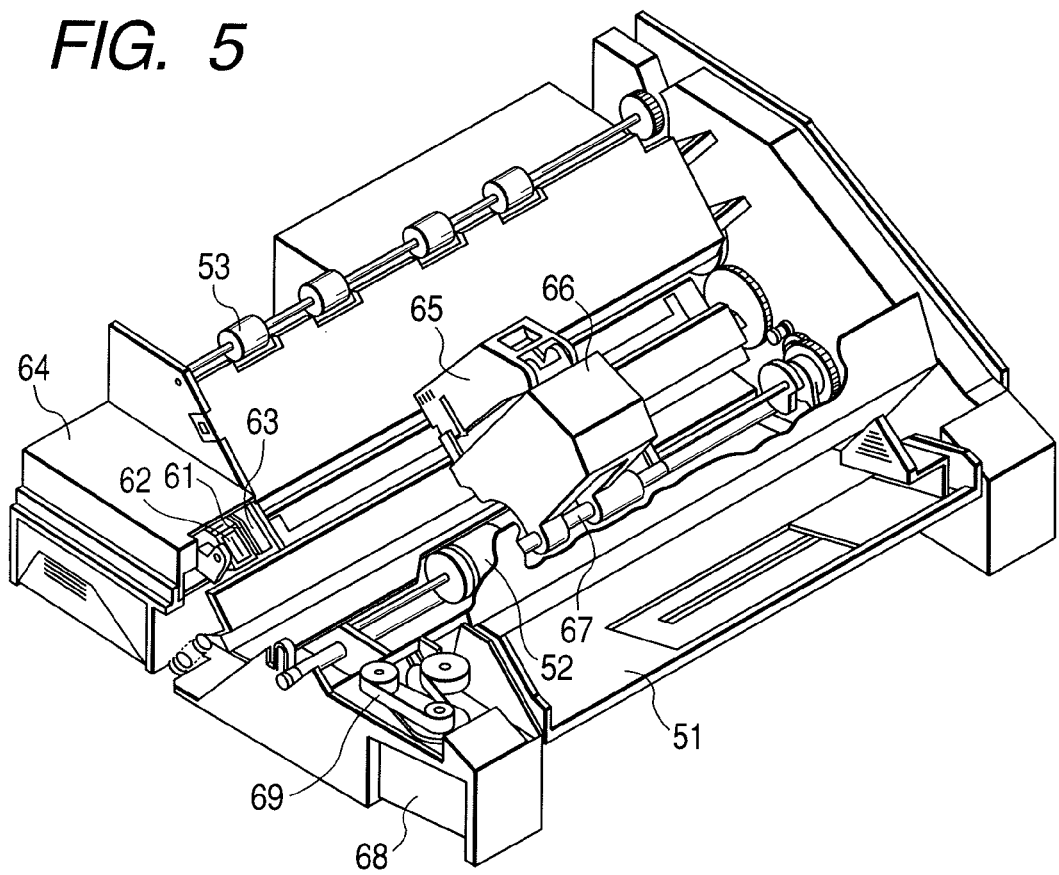
FIG. 5 is a perspective view showing an example of an ink jet recording apparatus.

FIG. 5 is a perspective view showing an example of an ink jet recording apparatus in which the recording head has been incorporated. A blade 61 is a wiping member, one end of which is retained by a blade-retaining member and which is in the form of a cantilever. The blade 61 is provided at the position adjacent to the region in which a recording head 65 performs recording, and is retained in such a form as to project into the course through which the recording head 65 is moved.

Reference numeral 62 denotes a cap for the face of ejection orifices of the recording head 65, which is disposed at the home position adjacent to the blade 61, and is so set up that it moves in the direction perpendicular to the direction of movement of the recording head 65, and comes into contact with the face of ejection orifices to carry out capping. Reference numeral 63 denotes an ink absorber provided adjacently to the blade 61, and, like the blade 61, is retained in such a form as to project into the course through which the recording head 65 is moved. An ejection restoration assembly 64 is made up of the blade 61, the cap 62 and the ink absorber 63. The blade 61 and the ink absorber 63 remove water, dust and so forth from the ejection orifice face.

Reference numeral 65 denotes the recording head which has an ejection energy generating means and ejects the ink to a recording medium set opposite to the ejection orifice face provided with ejection orifices, performing recording. Reference numeral 66 denotes a carriage on which the recording head 65 is mounted so that the recording head 65 can be moved. The carriage 66 is slidably associated with a guide shaft 67. Part of the carriage 66 is connected (not shown) with a belt 69 driven by a motor 68. Thus, the carriage 66 can be moved along the guide shaft 67 and hence the recording head 65 can be moved from a recording region to a region adjacent thereto.

Reference numeral 51 denotes a paper feeding part from which recording mediums are inserted, and reference numeral 52 denotes a paper feed roller driven by a motor (not shown). With such make-up, the recording medium is fed to the position opposite to the ejection orifice face of the recording head 65, and with the progress of recording, discharged to a paper delivery section provided with a paper delivery roller 53. The cap 62 of the ejection restoration assembly 64 recedes from the moving course of the recording head 65 when the recording head 65 returns to its home position after completion of recording, while the blade 61 projects into the moving course. Thus, the ejection orifice face of the recording head 65 is wiped.

When the cap 62 comes into contact with the ejection orifice face of the recording head 65 to carry out capping, the cap 62 is moved in such a manner as to project into the moving course of the recording head. When the recording head 65 is moved from its home position to the position at which the recording is started, the cap 62 and the blade 61 are present at the same position as the above position where the ejection orifice face is wiped. As a result, the ejection orifice face of the recording head 65 is wiped also at the time of this movement. The movement of the recording head to its home position is performed not only when recording is completed or ejection is restored, but also when the recording head is moved over recording regions for the purpose of recording, during which the recording head is moved to the home position adjacent to each recording region at given intervals, where the ejection orifice face is wiped also in conjunction with this movement.

Figure 6:
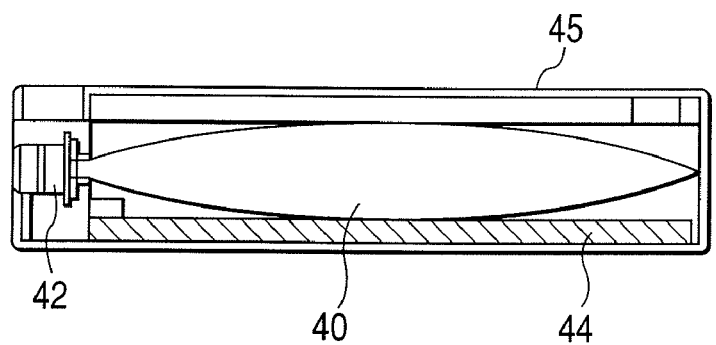
FIG. 6 is a longitudinal sectional view of an ink cartridge.

FIG. 6 is a view showing an example of an ink cartridge 45 that stores the ink being fed to the recording head through an ink-feeding member, e.g., a tube. Here, reference numeral 40 denotes an ink storing portion, e.g., an ink bag, having stored therein the feeding ink. The top thereof is provided with a stopper 42 made of rubber. A needle (not shown) may be inserted into this stopper 42 so that the ink in the ink bag 40 can be fed to the head. Reference numeral 44 denotes an absorber which receives a waste ink.

Figure 7:
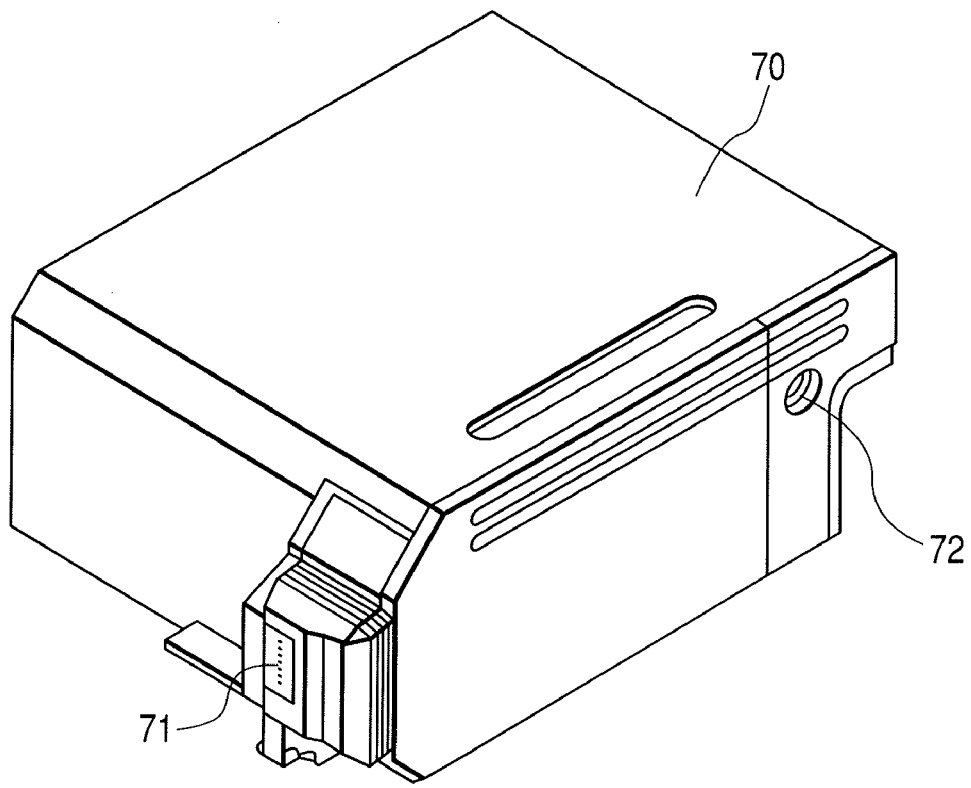
FIG. 7 is a perspective view showing an example of a recording unit.

In the present invention, without being limited to the recording unit in which the recording head and the ink cartridge are separated, a recording unit is also preferably usable in which these are integrally formed as shown in FIG. 7. In FIG. 7, reference numeral 70 denotes a recording unit, in the interior of which an ink storing portion that has stored an ink, e.g., an ink absorber, is stored, where the ink in such an ink absorber is ejected in the form of ink droplets from a recording head 71 having a plurality of orifices. In place of the ink absorber, the recording unit may be so set up that the ink storing portion is an ink bag provided internally with a spring or the like. Reference numeral 72 denotes an air path opening through which the interior of the cartridge is communicated with the atmosphere. This recording unit 70 is used in place of the recording head 65 shown in FIG. 5, and is detachably mountable to the carriage 66.

Next, an ink jet recording apparatus which utilizes mechanical energy will be described. This apparatus is characterized by having a recording head which is provided with a nozzle-formed substrate having a plurality of nozzles, a pressure generating device composed of a piezoelectric material and a conductive material, and an ink with which the surrounding of the pressure generating device is filled, and in which the pressure generating device is distorted by an applied voltage to eject liquid droplets from the nozzles.

Figure 8:
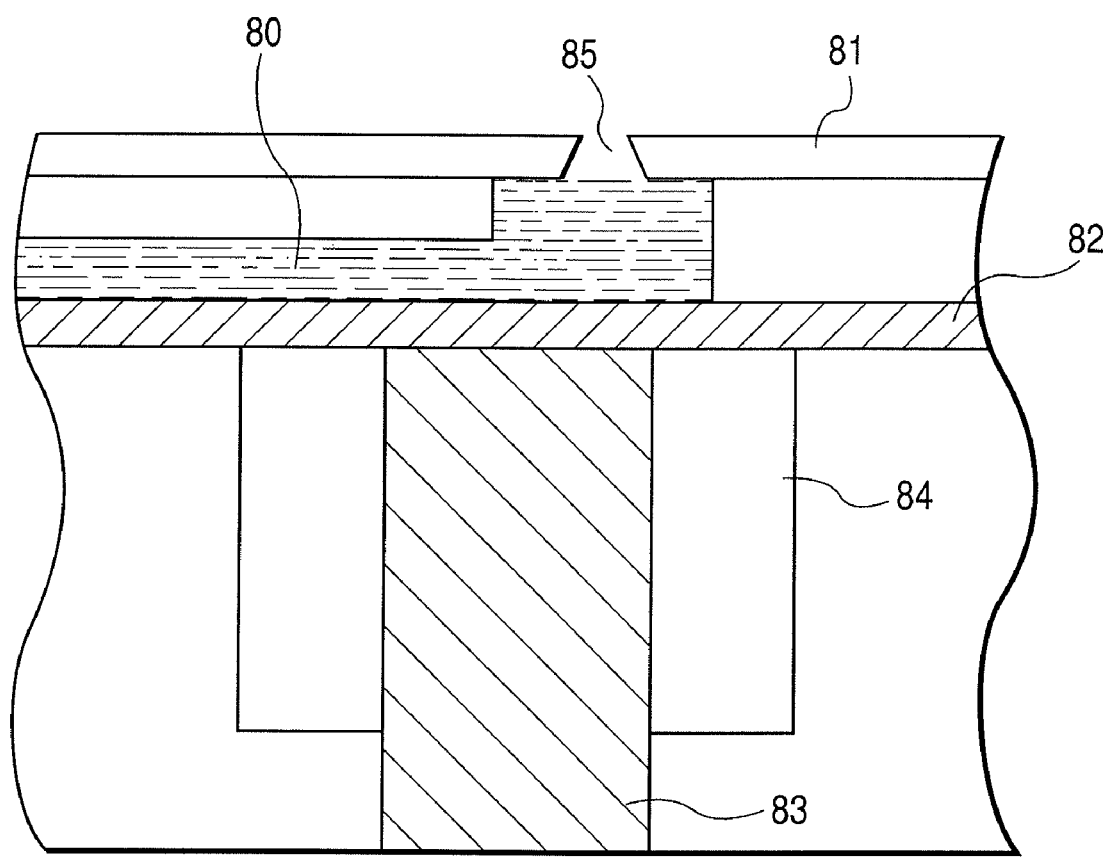
FIG. 8 is a diagrammatic view showing an example of the configuration of a recording head.

FIG. 8 is a diagrammatic view showing an example of the configuration of such a recording head. The recording head is made up of an ink channel 80 communicating with an ink chamber (not shown), an orifice plate 81, a vibrating plate 82 which causes a pressure to act directly on the ink, a piezoelectric device 83 which is joined to this vibrating plate 82 and is distorted according to electric signals, and a substrate 84 for supporting and fastening the orifice plate 81 and the vibrating plate 82. Distortion stress produced by imparting a pulsewise voltage to the piezoelectric device 83 deforms of the vibrating plate jointed to the piezoelectric device 83, to thereby apply a pressure to the ink inside the ink channel 80, so that ink droplets are ejected from an ejection orifice 85 of the orifice plate 81. Such a recording head may be used in the state it is incorporated in the same ink jet recording apparatus as that shown in FIG. 5.

The liquid composition of the present invention may be used in the above mentioned ink jet recording apparatus, provided that the term "ink" is replaced by "liquid composition" in reading the pertinent description. That is, the cartridge of the present invention may be the cartridge having a liquid composition storing portion which stores a liquid composition therein, where the liquid composition of the present invention may be used as the liquid composition stored in the liquid composition storing portion. The recording unit of the present invention may be the recording unit having a liquid composition storing portion which stores a liquid composition therein and a recording head which ejects the liquid composition therefrom, where the liquid composition of the present invention may be used as the liquid composition stored in the liquid composition storing portion. The ink jet recording apparatus of the present invention may be the ink jet recording apparatus having a liquid composition storing portion which stores a liquid composition therein and a recording head which ejects the liquid composition therefrom, where the liquid composition of the present invention may be used as the liquid composition stored in the liquid composition storing portion.

EXAMPLES

The present invention is described below in greater detail by giving Examples, Comparative Examples and Reference Examples. The present invention is by no means limited by the following Examples unless it is beyond its gist. In the following, reference to "part(s)" or "%" is by mass unless particularly noted.

Preparation of Aqueous Polymer Solution

To each polymer of Polymers 1 to 28 obtained from copolymerizing the monomers shown in Table 1 (the weight average molecular weight of each polymer is shown in Table 1), ion-exchange water was added to prepare Aqueous Polymer Solutions 1 to 28 in which each polymer was in a solid-matter concentration of 10% by mass. For each polymer, the copolymer was neutralized with an aqueous 10% by mass potassium hydroxide solution and was used as the polymer. In the table 1, the monomers are abbreviated as follows.

TABLE 1

Primary Properties of Aqueous Polymer Solutions 1 to 28

| | Polymer No. in Aqueous Polymer Solution | Weight average molecular weight of polymer | Compositional (mass) ratio of monomers constituting each polymer | | | | | | |
|---|---|---|---|---|---|---|---|---|---|
| | | | St | α-MSt | BZMA | nBA | MMA | MA | AA |
| Aqueous Polymer Solution | 1 Polymer 1 | 5,000 | 28 | | | | 58 | | 14 |
| | 2 Polymer 2 | 15,000 | 12 | | 72 | | | 16 | |
| | 3 Polymer 3 | 5,000 | | | 83 | | | | 17 |
| | 4 Polymer 4 | 5,000 | 18 | | | 68 | | | 14 |
| | 5 Polymer 5 | 5,000 | 33 | | | 44 | | | 23 |
| | 6 Polymer 6 | 5,000 | 80 | | | 6 | | | 14 |
| | 7 Polymer 7 | 6,000 | 18 | | | 68 | | | 14 |
| | 8 Polymer 8 | 9,000 | 18 | | | 68 | | | 14 |
| | 9 Polymer 9 | 10,000 | 18 | | | 68 | | | 14 |
| | 10 Polymer 10 | 5,000 | 72 | | | 15 | | | 13 |
| | 11 Polymer 11 | 5,000 | 57 | | | 29 | | | 14 |
| | 12 Polymer 12 | 5,000 | 65 | | | 22 | | | 13 |
| | 13 Polymer 13 | 5,000 | 7 | | | 69 | | | 24 |
| | 14 Polymer 14 | 5,000 | 84 | | | 2 | | | 14 |
| | 15 Polymer 15 | 5,000 | 14 | | | 75 | | | 11 |
| | 16 Polymer 16 | 5,000 | 39 | | | 36 | | | 25 |
| | 17 Polymer 17 | 6,000 | 71 | | 8 | | | | 21 |
| | 18 Polymer 18 | 6,000 | 48 | 34 | | | | | 18 |
| | 19 Polymer 19 | 6,000 | 40 | 35 | | | | | 25 |
| | 20 Polymer 20 | 9,000 | 40 | 35 | | | | | 25 |
| | 21 Polymer 21 | 9,000 | 48 | 34 | | | | | 18 |
| | 22 Polymer 22 | 6,000 | 82 | | | | | | 18 |
| | 23 Polymer 23 | 6,000 | 39 | 36 | | | | | 25 |
| | 24 Polymer 24 | 5,000 | 48 | 34 | | | | | 18 |
| | 25 Polymer 25 | 10,000 | 48 | 34 | | | | | 18 |
| | 26 Polymer 26 | 6,000 | 65 | | 17 | | | | 18 |
| | 27 Polymer 27 | 6,000 | 49 | 35 | | | | | 16 |
| | 28 Polymer 28 | 6,000 | 70 | | 5 | | | | 25 |

St: styrene
α-MSt: α-methylstyrene
BZMA: benzyl methacrylate
nBA: n-butyl acrylate
MMA: methyl methacrylate
MA: methacrylate
AA: acrylic acid Hydrogen bond parameter (δh) of polymer that is obtained by the solubility parameters of monomers constituting the polymer:

The hydrogen bond parameter (δh) of polymer that is obtained by the solubility parameters of monomers constituting the polymer was found in the following way. First, the hydrogen bond parameter (δh) of each monomer constituting the subject polymer was obtained by the solubility parameter inherent in each monomer constituting the polymer. Then, the hydrogen bond parameter (δh) of each monomer constituting the polymer obtained above was multiplied by the compositional (mass) ratio of each monomer constituting the polymer (compositional ratio when the sum total is defined as 1) to find respective values. Next, the values obtained were summed up to find the hydrogen bond parameter (δh) of polymer that is obtained by the solubility parameters of monomers constituting the polymer. In respect of each polymer used in preparing the aqueous polymer solutions, the hydrogen bond parameter (δh) of each monomer that was obtained by the solubility parameter inherent in each monomer constituting the polymer is shown in Table 2.

Taking Polymer 1 as an example, which is a copolymer of styrene, methyl methacrylate and acrylic acid (compositional (mass) ratio=28:58:14), it will be specifically explained below how to find the hydrogen bond parameter (δh) of polymer that is obtained by the solubility parameters of monomers constituting the polymer. As is seen from Table 2 below, the hydrogen bond parameters (the unit is $cal^{0.5}/cm^{1.5}$) obtained by the solubility parameters of styrene, methyl methacrylate and acrylic acid constituting the Polymer 1 are 0.00, 3.93 and 5.81, respectively. Therefore, the hydrogen bond parameter (δh) of Polymer 1 that is obtained by the solubility parameters of monomers constituting Polymer 1 is found as shown by the following expression.

Hydrogen bond parameter (δh) of polymer that is obtained by the solubility parameters of monomers constituting the polymer
=0.00×0.28+3.93×0.58+5.81×0.14
=3.09 $cal^{0.5}/cm^{1.5}$.

TABLE 2

Hydrogen Bond Parameter of Each Monomer

| Monomer | | Hydrogen bond parameter (δh) |
|---|---|---|
| Type | Abbr. | $(cal^{0.5}/cm^{1.5})$*1 |
| Styrene | St | 0.00 |
| α-Methylstyrene | α-MSt | 0.00 |
| Benzyl methacrylate | BZMA | 3.21 |

TABLE 2-continued

Hydrogen Bond Parameter of Each Monomer

| Monomer | | Hydrogen bond parameter (δh) |
|---|---|---|
| Type | Abbr. | $(cal^{0.5}/cm^{1.5})*1$ |
| n-Butyl acrylate | nBA | 3.44 |
| Methyl methacrylate | MMA | 3.93 |
| Methacrylate | MA | 5.30 |
| Acrylic acid | AA | 5.81 |

*1Hydrogen bond parameter (δh) obtained by the solubility parameter inherent in each monomer.

In respect of the polymers in the aqueous polymer solutions prepared beforehand, the values of the hydrogen bond parameter (δh) of polymer that is obtained by the solubility parameters of monomers constituting the polymer are shown in Table 3. The values of the acid value and weight average molecular weight of each polymer are shown in Table 3. Further, Table 3 shows the values of the mass ratio of n-butyl acrylate or α-methylstyrene to styrene in the polymers each having, as monomers, styrene and n-butyl acrylate, or styrene and α-methylstyrene.

TABLE 3

Properties of Polymer in Aqueous Polymer Solution

| | Polymer | Hydrogen bond parameter (δh) of polymer $(cal^{0.5}/cm^{1.5})*1$ | Acid value of polymer (mgKOH/g) | Weight average molecular weight of polymer | nBA/St *2 | α-MSt/St *3 |
|---|---|---|---|---|---|---|
| Aqueous Polymer Solution: | 1 Polymer 1 | 3.09 | 90 | 5,000 | — | — |
| | 2 Polymer 2 | 3.16 | 90 | 15,000 | — | — |
| | 3 Polymer 3 | 3.65 | 90 | 5,000 | — | — |
| | 4 Polymer 4 | 3.15 | 90 | 5,000 | 3.78 | — |
| | 5 Polymer 5 | 2.85 | 150 | 5,000 | 1.33 | — |
| | 6 Polymer 6 | 1.02 | 90 | 5,000 | 0.08 | — |
| | 7 Polymer 7 | 3.15 | 90 | 6,000 | 3.78 | — |
| | 8 Polymer 8 | 3.15 | 90 | 9,000 | 3.78 | — |
| | 9 Polymer 9 | 3.15 | 90 | 10,000 | 3.78 | — |
| | 10 Polymer 10 | 1.27 | 90 | 5,000 | 0.21 | — |
| | 11 Polymer 11 | 1.81 | 90 | 5,000 | 0.51 | — |
| | 12 Polymer 12 | 1.51 | 90 | 5,000 | 0.34 | — |
| | 13 Polymer 13 | 3.77 | 150 | 5,000 | 9.86 | — |
| | 14 Polymer 14 | 0.88 | 90 | 5,000 | 0.02 | — |
| | 15 Polymer 15 | 3.22 | 80 | 5,000 | 5.36 | — |
| | 16 Polymer 16 | 2.69 | 160 | 5,000 | 0.92 | — |
| | 17 Polymer 17 | 1.48 | 160 | 6,000 | — | — |
| | 18 Polymer 18 | 1.05 | 160 | 6,000 | — | 0.71 |
| | 19 Polymer 19 | 1.45 | 200 | 6,000 | — | 0.88 |
| | 20 Polymer 20 | 1.45 | 200 | 9,000 | — | 0.88 |
| | 21 Polymer 21 | 1.05 | 160 | 9,000 | — | 0.71 |
| | 22 Polymer 22 | 1.05 | 160 | 6,000 | — | — |
| | 23 Polymer 23 | 1.45 | 200 | 6,000 | — | 0.92 |
| | 24 Polymer 24 | 1.05 | 160 | 5,000 | — | 0.71 |
| | 25 Polymer 25 | 1.05 | 160 | 10,000 | — | 0.71 |
| | 26 Polymer 26 | 1.59 | 160 | 6,000 | — | — |
| | 27 Polymer 27 | 0.93 | 160 | 6,000 | — | 0.71 |
| | 28 Polymer 28 | 1.61 | 210 | 6,000 | — | — |

*1: Hydrogen bond parameter (δh) of polymer that is obtained by the solubility parameters of monomers constituting the polymer.
*2: Mass ratio of n-butyl acrylate to styrene in polymer.
*3: Mass ratio of α-methylstyrene to styrene in polymer.

Preparation of Pigment Dispersions

Preparation of Pigment Dispersion 1

10 parts of a pigment, 5 parts of Polymer 11 obtained from copolymerizing the monomers shown in Table 1 and 85 parts of ion-exchange water were mixed, followed by dispersion for 3 hours by means of a batch type vertical sand mill to prepare Pigment Dispersion 1. Here, C.I. Pigment Blue 15:3 was used as the pigment. As Polymer 11, the copolymer was neutralized with an aqueous 10% by mass potassium hydroxide solution and was used as the polymer. The dispersion thus obtained was subjected to pressure filtration with a filter of 2.5 μm in pore size (trade name: HD CII, available from Nihon Pall Ltd.). To this dispersion, water was added to prepare Pigment Dispersion 1 having a pigment concentration of 10% by mass and a polymer concentration of 5% by mass.

Preparation of Pigment Dispersion 2

Pigment Dispersion 2 having a pigment concentration of 10% by mass and a polymer concentration of 5% by mass was prepared in the same manner as Pigment Dispersion 1 except that Polymer 13 obtained from copolymerizing the monomers shown in Table 1 was used in place of Polymer 11.

Preparation of Pigment Dispersion 3

Pigment Dispersion 3 having a pigment concentration of 10% by mass and a polymer concentration of 5% by mass was prepared in the same manner as Pigment Dispersion 1 except that Polymer 18 obtained from copolymerizing the monomers shown in Table 1 was used in place of Polymer 11.

Synthesis of Modified Siloxane Compounds

Modified siloxane compounds, Compounds 1 to 12, were synthesized according to the following Synthesis Examples.

Compound 1:

Using a container made of glass and provided with a thermometer and a stirring means, Compound 1 was synthesized in the following way. In the container, a polysiloxane compound represented by the following Formula (A) and a polyoxyethylene compound represented by the following Formula (B) as main components were subjected to addition reaction in the presence of a platinum catalyst to synthesize Compound 1. Compound 1 thus obtained corresponded to the modified siloxane compound represented by Formula (1), and was found to have a weight average molecular weight of 8,500, an HLB of 5 (theoretical value) and a solubility in water of 1% or less. The Compound 1 had the structure of $m=73$, $n=6$, $R_1$=propylene group, $a=8$, $b=0$ and $R_2$=hydrogen atom in the Formula (1).

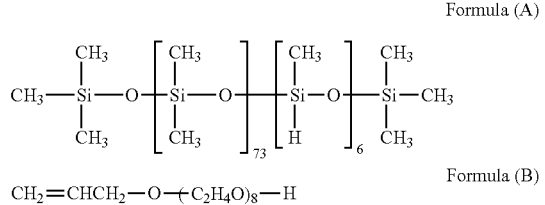

Formula (A)

$$CH_2=CHCH_2-O-(C_2H_4O)_8-H \quad \text{Formula (B)}$$

Compound 2:

Using a container made of glass and provided with a thermometer and a stirring means, Compound 2 was synthesized in the following way. In the container, a polysiloxane compound represented by the following Formula (C) and a polyoxyethylene compound represented by the following Formula (D) as main components were subjected to addition reaction in the presence of a platinum catalyst to synthesize Compound 2. Compound 2 thus obtained corresponded to the modified siloxane compound represented by Formula (1), and was found to have a weight average molecular weight of 29,400, an HLB of 5 (theoretical value) and a solubility in water of 1% or less. The Compound 2 had the structure of $m=245$, $n=28$, $R_1$=propylene group, $a=6$, $b=0$ and $R_2$=hydrogen atom in the Formula (1).

Formula (C)

$$CH_3-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_{245}-\left[\underset{\underset{H}{|}}{\overset{\overset{CH_3}{|}}{Si}}-O\right]_{28}-\underset{\underset{CH_3}{|}}{\overset{\overset{CH_3}{|}}{Si}}-CH_3$$

$$CH_2=CHCH_2-O-(C_2H_4O)_6-H \quad \text{Formula (B)}$$

$$CH_2-CHCH_2-O-(C_2H_4O)_6-H \quad \text{Formula (D)}$$

Compound 3:

Using a container made of glass and provided with a thermometer and a stirring means, Compound 3 was synthesized in the following way. In the container, a polysiloxane compound represented by the following Formula (E) and the polyoxyethylene compound represented by the following Formula (B) as main components were subjected to addition reaction in the presence of a platinum catalyst to synthesize Compound 3. Compound 3 thus obtained was a comparative compound of the modified siloxane compound represented by Formula (L), and was found to have a weight average molecular weight of 7,400, an HLB of 5 (theoretical value) and a solubility in water of 1% or less. The Compound 3 had the structure of $m=65$, $n=5$, $R_1$=propylene group, $a=8$, $b=0$ and $R_2$=hydrogen atom in the Formula (1).

Formula (E)

$$CH_3-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_{65}-\left[\underset{\underset{H}{|}}{\overset{\overset{CH_3}{|}}{Si}}-O\right]_{5}-\underset{\underset{CH_3}{|}}{\overset{\overset{CH_3}{|}}{Si}}-CH_3$$

$$CH_2=CHCH_2-O-(C_2H_4O)_8-H \quad \text{Formula (B)}$$

Compound 4:

Using a container made of glass and provided with a thermometer and a stirring means, Compound 4 was synthesized in the following way. In the container, a polysiloxane compound represented by the following Formula (F) and a polyoxyethylene compound represented by the following Formula (G) as main components were subjected to addition reaction in the presence of a platinum catalyst to synthesize Compound 4. Compound 4 thus obtained corresponded to the modified siloxane compound represented by Formula (2), and was found to have a weight average molecular weight of 47,000, an HLB of 9 (theoretical value) and a solubility in water of 1% or less. The Compound 4 had the structure of $p=349$, $R_3$=hydrogen atom, $R_4$=propylene group, $c=240$ and $d=0$ in the Formula (2).

Formula (F)

$$H-\left[\underset{\underset{CH_3}{|}}{\overset{\overset{CH_3}{|}}{SiO}}\right]_{350}-\underset{\underset{CH_3}{|}}{\overset{\overset{CH_3}{|}}{Si}}-H$$

$$CH_2=CHCH_2-O-(C_2H_4O)_{240}-H \quad \text{Formula (G)}$$

Compound 5:

Using a container made of glass and provided with a thermometer and a stirring means, Compound 5 was synthesized in the following way. In the container, a polysiloxane compound represented by the following Formula (H) and a polyoxyethylene compound represented by the following Formula (I) as main components were subjected to addition reaction in the presence of a platinum catalyst to synthesize Compound 5. Compound 5 thus obtained was a comparative compound of the modified siloxane compound represented by Formula (2), and was found to have a weight average molecular weight of 7,700, an HLB of 7 (theoretical value) and a solubility in water of 1% or less. The Compound 5 had the structure of $p=64$, $R_3$=hydrogen atom, $R_4$=propylene group, $c=30$ and $d=0$ in the Formula (2).

Formula (H)

$$H-\left[\underset{\underset{CH_3}{|}}{\overset{\overset{CH_3}{|}}{SiO}}\right]_{65}-\underset{\underset{CH_3}{|}}{\overset{\overset{CH_3}{|}}{Si}}-H$$

$$CH_2=CHCH_2-O-(C_2H_4O)_{30}-H \quad \text{Formula (I)}$$

Compound 6:

Using a container made of glass and provided with a thermometer and a stirring means, Compound 6 was synthesized in the following way. In the container, a polysiloxane compound represented by the following Formula (J) and a polyoxyethylene compound represented by the following Formula (K) as main components were subjected to addition reaction in the presence of a platinum catalyst to synthesize Compound 6. Compound 6 thus obtained was a comparative compound of the modified siloxane compound represented by Formula (2), and was found to have a weight average molecular weight of 50,400, an HLB of 7 (theoretical value) and a solubility in water of 1% or less. The Compound 6 had the structure of p=439, $R_3$ hydrogen atom, $R_4$=propylene group, c=200 and d=0 in the Formula (2).

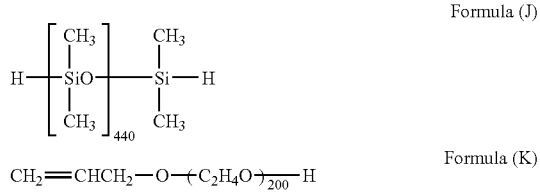

Compound 7:

Using a container made of glass and provided with a thermometer and a stirring means, Compound 7 was synthesized in the following way. In the container, a polysiloxane compound represented by the following Formula (L) and a polyoxyethylene compound represented by the following Formula (M) as main components were subjected to addition reaction in the presence of a platinum catalyst to synthesize Compound 7. Compound 7 thus obtained corresponded to the modified siloxane compound represented by Formula (3), and was found to have a weight average molecular weight of 49,000, an HLB of 6 (theoretical value) and a solubility in water of 1% or less. The Compound 7 had the structure of q=7, $R_5$=propylene group, $R_6$=propylene group, e=6, f=0 and r=52 in the Formula (3).

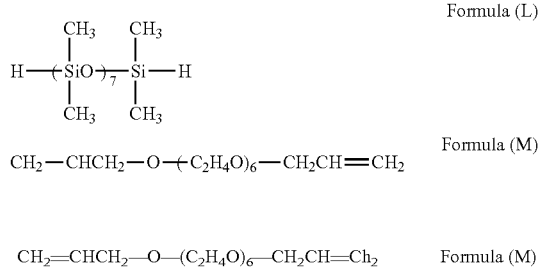

Compound 8:

Using a container made of glass and provided with a thermometer and a stirring means, Compound 8 was synthesized in the following way. In the container, a polysiloxane compound represented by the following Formula (N) and a polyoxyethylene compound represented by the following Formula (O) as main components were subjected to addition reaction in the presence of a platinum catalyst to synthesize Compound 8. Compound 8 thus obtained corresponded to the modified siloxane compound represented by Formula (3), and was found to have a weight average molecular weight of 8,800, an HLB of 6 (theoretical value) and a solubility in water of 1% or less. The Compound 8 had the structure of q=23, $R_5$=propylene group, $R_6$=propylene group, e=18, f=0 and r=3 in the Formula (3).

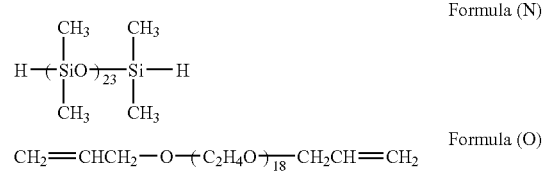

Compound 9:

Using a container made of glass and provided with a thermometer and a stirring means, Compound 9 was synthesized in the following way. In the container, a polysiloxane compound represented by the following Formula (P) and the polyoxyethylene compound represented by the following Formula (O) as main components were subjected to addition reaction in the presence of a platinum catalyst to synthesize Compound 9. Compound 9 thus obtained was a comparative compound of the modified siloxane compound represented by Formula (3), and was found to have a weight average molecular weight of 49,000, an HLB of 7 (theoretical value) and a solubility in water of 1% or less. The Compound 9 had the structure of q=18, $R_5$=propylene group, $R_6$=propylene group, e=18, f=0 and r=21 in the Formula (3).

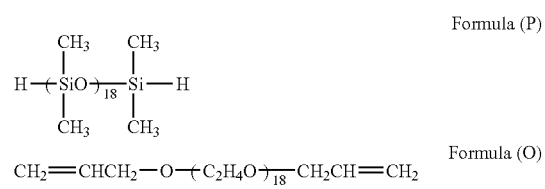

Compound 10:

Using a container made of glass and provided with a thermometer and a stirring means, Compound 10 was synthesized in the following way. In the container, a polysiloxane compound represented by the following Formula (Q) and a polyoxyethylene compound represented by the following Formula (O) as main components were subjected to addition reaction in the presence of a platinum catalyst to synthesize Compound 10. Compound 10 thus obtained was a comparative compound of the modified siloxane compound represented by Formula (3), and was found to have a weight average molecular weight of 55,000, an HLB of 6 (theoretical value) and a solubility in water of 1% or less. The Compound 10 had the structure of q=24, $R_5$=propylene group, $R_6$=propylene group, e=18, f=0 and r=20 in the Formula (3).

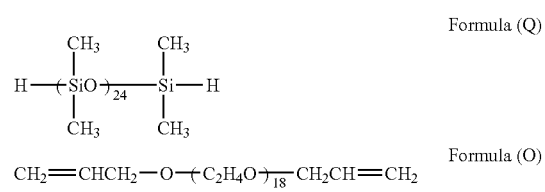

Compound 11:

Using a container made of glass and provided with a thermometer and a stirring means, Compound 11 was synthesized in the following way. In the container, a polysiloxane compound represented by the following Formula (R) and a polyoxyethylene compound represented by the following Formula (S) as main components were subjected to addition reaction in the presence of a platinum catalyst to synthesize Compound 11. Compound 11 thus obtained corresponded to the modified siloxane compound represented by Formula (3), and was found to have a weight average molecular weight of 8,800, an HLB of 1 (theoretical value) and a solubility in water of 1% or less. The Compound 11 had the structure of q=16, $R_5$=propylene group, $R_6$=propylene group, e 2, f=0 and r=6 in the Formula (3).

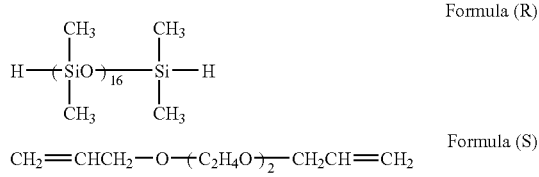

Formula (R)

Formula (S)

Compound 12:

Using a container made of glass and provided with a thermometer and a stirring means, Compound 12 was synthesized in the following way. In the container, a polysiloxane compound represented by the following Formula (T) and a polyoxyethylene compound represented by the following Formula (U) as main components were subjected to addition reaction in the presence of a platinum catalyst to synthesize Compound 12. Compound 12 thus obtained was a comparative compound of the modified siloxane compound represented by Formula (3), and was found to have a weight average molecular weight of 7,800, an HLB of 6 (theoretical value) and a solubility in water of 1% or less. The Compound 12 had the structure of q=8, $R_5$=propylene group, $R_6$=propylene group, e=7, f=0 and r=7 in the Formula (3).

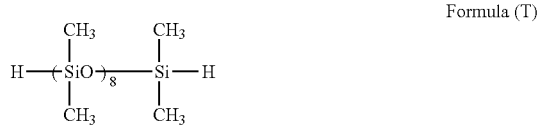

Formula (T)

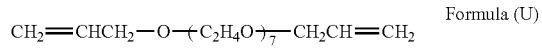

Formula (U)

The weight average molecular weight of each compound obtained as above was measured in the following way. The modified siloxane compound to be measured was put in tetrahydrofuran (THF) and left standing for several hours to dissolve to prepare a solution so as for the sample to be in a concentration of 0.1% by mass. Thereafter, the solution was filtered with a solvent-resistant membrane filter of 0.45 μm in pore size (trade name: TITAN 2 Syringe Filter, PTFE, 0.45 μm; available from SUN-SRI). Using this sample solution, the weight average molecular weight was measured under the following conditions. Apparatus: Alliance GPC 2695 (manufactured by Waters Corporation).

Columns: SHODEX KF-806M, four columns connected (available from Showa Denko K.K.).

Mobile phase: tetrahydrofuran (special grade).

Flow rate: 1.0 mL/min.

Oven temperature: 40.0° C.

Amount of sample solution injected: 0.1 mL.

Detector: RI (refractive index) detector.

Polystyrene standard samples: PS-1 and PS-2 (available from Polymer Laboratories Inc.); molecular weight: 7,500,000, 2,560,000, 841,700, 377,400, 320,000, 210,500, 148,000, 96,000, 59,500, 50,400, 28,500, 20,650, 10,850, 5,460, 2,930, 1,300 and 580, seventeen types.

Preparation of Liquid Compositions

Liquid compositions were prepared by using components shown in the following Tables 4-1 to 4-11, containing any of the aqueous polymer solutions prepared as above, the modified siloxane compounds synthesized as above or commercially available modified siloxane compounds. Specifically, the components shown in Tables 4-1 to 4-11 were mixed under formulation shown in each Table, and were thoroughly stirred, followed by pressure filtration with a filter of 2.5 μm in pore size (trade name: HD CII, available from Nihon Pall Ltd.) to prepare liquid compositions. In Tables 4-1 to 4-11, "Mw" refers to the weight average molecular weight.

TABLE 4-1

| | Formulation of Liquid Composition (Unit: %) | | | | | | | | | | | | |
|---|---|---|---|---|---|---|---|---|---|---|---|---|---|
| | Liquid Composition | | | | | | | | | | | | |
| | 1 | 2 | 3 | 4 | 5 | 6 | 7 | 8 | 9 | 10 | 11 | 12 | 13 |
| Glycerol | 5.0 | 5.0 | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 | 5.0 | 5.0 | 5.0 | 5.0 | 5.0 | 5.0 | 5.0 |
| Aqueous Polymer Solution 11, containing Polymer 11 | 40.0 | 40.0 | 40.0 | 40.0 | 40.0 | 40.0 | 40.0 | 40.0 | 40.0 | 40.0 | 25.0 | 24.0 | 42.0 |
| FZ-2104 (Dow Corning Toray) (MW20,600/HLB9) | 0.5 | | | | | | | | | | 0.5 | 0.5 | 0.5 |
| FZ-2130 (Dow Corning Toray) (MW21,500/HLB7) | | 0.5 | | | | | | | | | | 0.4 | |
| FZ-2191 (Dow Corning Toray) (MW18,000/HLB5) | | | 0.5 | | | | | | | | | | |

TABLE 4-1-continued

Formulation of Liquid Composition (Unit: %)

| | Liquid Composition | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| KF-615A (Shin-Etsu Chemical) (MW18,000/HLB10) | | | | 0.5 | | | | 2.9 | 3.0 | | | | |
| TSF4452 (GE Toshiba Silicone) (MW26,000/HLB11) | | | | | 0.5 | | | | | | | | |
| Compound 1 (MW8,500/HLB5) | | | | | | 0.5 | | | | | | | |
| Compound 2 (MW29,400/HLB5) | | | | | | | 0.5 | | | | | | |
| Water | 44.5 | 44.5 | 44.5 | 44.5 | 44.5 | 44.5 | 44.5 | 42.1 | 42.0 | 44.6 | 59.5 | 60.5 | 42.5 |

TABLE 4-2

Formulation of Liquid Composition (Unit: %)

| | Liquid Composition | | | | | | | | | | | |
|---|---|---|---|---|---|---|---|---|---|---|---|---|
| | 14 | 15 | 16 | 17 | 18 | 19 | 20 | 21 | 22 | 23 | 24 | 25 |
| Glycerol | 5.0 | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 | 5.0 | 5.0 | 5.0 | 5.0 | 5.0 | 5.0 |
| Aqueous Polymer Solution 1, containing Polymer 1 | 40.0 | | | | | | | | | | | |
| Aqueous Polymer Solution 2, containing Polymer 2 | | 40.0 | | | | | | | | | | |
| Aqueous Polymer Solution 3, containing Polymer 3 | | | 40.0 | | | | | | | | | |
| Aqueous Polymer Solution 4, containing Polymer 4 | | | | 40.0 | | | | | | | | |
| Aqueous Polymer Solution 5, containing Polymer 5 | | | | | 40.0 | | | | | | | |
| Aqueous Polymer Solution 6, containing Polymer 6 | | | | | | 40.0 | | | | | | |
| Aqueous Polymer Solution 7, containing Polymer 7 | | | | | | | 40.0 | | | | | |
| Aqueous Polymer Solution 8, containing Polymer 8 | | | | | | | | 40.0 | | | | |
| Aqueous Polymer Solution 9, containing Polymer 9 | | | | | | | | | 40.0 | | | |
| Aqueous Polymer Solution 10, containing Polymer 10 | | | | | | | | | | 40.0 | | |
| Aqueous Polymer Solution 11, containing Polymer 11 | | | | | | | | | | | 40.0 | |
| Aqueous Polymer Solution 12, containing Polymer 12 | | | | | | | | | | | | 40.0 |
| FZ-2104 (Dow Corning Toray) (MW20,600/HLB9) | 0.5 | 0.5 | 0.5 | 0.5 | 0.5 | 0.5 | 0.5 | 0.5 | 0.5 | 0.5 | 0.5 | 1.0 |
| Water | 44.5 | 44.5 | 44.5 | 44.5 | 44.5 | 44.5 | 44.5 | 44.5 | 44.5 | 44.5 | 44.5 | 44.0 |

TABLE 4-3

Formulation of Liquid Composition (Unit: %)

| | Liquid Composition | | | | | | | |
|---|---|---|---|---|---|---|---|---|
| | 26 | 27 | 28 | 29 | 30 | 31 | 32 | 33 |
| Glycerol | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 | 5.0 | 5.0 |
| Aqueous Polymer Solution 11, containing Polymer 11 | 40.0 | 40.0 | 40.0 | 40.0 | | | | |
| Aqueous Polymer Solution 13, containing Polymer 13 | | | | | 40.0 | | | |
| Aqueous Polymer Solution 14, containing Polymer 14 | | | | | | | 40.0 | |
| Aqueous Polymer Solution 15, containing Polymer 15 | | | | | | | | 40.0 |
| Aqueous Polymer Solution 16, containing Polymer 16 | | | | | | 40.0 | | |
| FZ-2104 (Dow Corning Toray) (MW20,600/HLB9) | | | | | 0.5 | 0.5 | 0.5 | 0.5 |
| FZ-2110 (Dow Corning Toray) (MW7,200/HLB1) | 0.5 | | | | | | | |
| FZ-2162 (Dow Corning Toray) (MW4,300/HLB15) | | 0.5 | | | | | | |
| KF-354L (Shin-Etsu Chemical) (MW7,900/HLB15) | | | 0.5 | | | | | |
| Compound 3 (MW7,400/HLB5) | | | | 0.5 | | | | |
| Water | 44.5 | 44.5 | 44.5 | 44.5 | 44.5 | 44.5 | 44.5 | 44.5 |

TABLE 4-4

Formulation of Liquid Composition (Unit: %)

| | Liquid Composition | | | | | | | | |
|---|---|---|---|---|---|---|---|---|---|
| | 34 | 35 | 36 | 37 | 38 | 39 | 40 | 41 | 42 |
| Glycerol | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 | 5.0 | 5.0 | 5.0 |
| Aqueous Polymer Solution 11, containing Polymer 11 | 40.0 | 40.0 | 40.0 | 40.0 | 40.0 | 40.0 | 25.0 | 24.0 | 42.0 |
| BYK333 (Byk Chemie) (MW8,000/HLB10) | 0.5 | | 2.9 | 3.0 | 0.4 | 1.0 | 2.9 | 2.9 | 1.0 |
| Compound 4 (MW47,000/HLB9) | | 0.5 | | | | | | | |
| Water | 44.5 | 44.5 | 42.1 | 42.0 | 44.6 | 44.0 | 57.1 | 58.1 | 42.0 |

TABLE 4-5

Formulation of Liquid Composition (Unit: %)

| | Liquid Composition | | | | | | | | | | |
|---|---|---|---|---|---|---|---|---|---|---|---|
| | 43 | 44 | 45 | 46 | 47 | 48 | 49 | 50 | 51 | 52 | 53 |
| Glycerol | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 |

TABLE 4-5-continued

Formulation of Liquid Composition (Unit: %)

| | Liquid Composition | | | | | | | | | | |
|---|---|---|---|---|---|---|---|---|---|---|---|
| | 43 | 44 | 45 | 46 | 47 | 48 | 49 | 50 | 51 | 52 | 53 |
| Polyethylene glycol (av. molecular weight: 1,000) | 5.0 | 5.0 | 5.0 | 5.0 | 5.0 | 5.0 | 5.0 | 5.0 | 5.0 | 5.0 | 5.0 |
| Aqueous Polymer Solution 1, containing Polymer 1 | 40.0 | | | | | | | | | | |
| Aqueous Polymer Solution 2, containing Polymer 2 | | 40.0 | | | | | | | | | |
| Aqueous Polymer Solution 3, containing Polymer 3 | | | 40.0 | | | | | | | | |
| Aqueous Polymer Solution 4, containing Polymer 4 | | | | 40.0 | | | | | | | |
| Aqueous Polymer Solution 5, containing Polymer 5 | | | | | 40.0 | | | | | | |
| Aqueous Polymer Solution 6, containing Polymer 6 | | | | | | 40.0 | | | | | |
| Aqueous Polymer Solution 7, containing Polymer 7 | | | | | | | 40.0 | | | | |
| Aqueous Polymer Solution 8, containing Polymer 8 | | | | | | | | 40.0 | | | |
| Aqueous Polymer Solution 9, containing Polymer 9 | | | | | | | | | 40.0 | | |
| Aqueous Polymer Solution 10, containing Polymer 10 | | | | | | | | | | 40.0 | |
| Aqueous Polymer Solution 12, containing Polymer 12 | | | | | | | | | | | 40.0 |
| BYK333 (Byk Chemie) (MW8,000/HBL10) | 1.0 | 1.0 | 1.0 | 1.0 | 1.0 | 1.0 | 1.0 | 1.0 | 1.0 | 1.0 | 1.0 |
| Water | 44.0 | 44.0 | 44.0 | 44.0 | 44.0 | 44.0 | 44.0 | 44.0 | 44.0 | 44.0 | 44.0 |

TABLE 4-6

Formulation of Liquid Composition (Unit: %)

| | Liquid Composition | | | | | | |
|---|---|---|---|---|---|---|---|
| | 54 | 55 | 56 | 57 | 58 | 59 | 60 |
| Glycerol | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 | 5.0 |
| Aqueous Polymer Solution 11, containing Polymer 11 | 40.0 | 40.0 | 40.0 | | | | |
| Aqueous Polymer Solution 13, containing Polymer 13 | | | | 40.0 | | | |
| Aqueous Polymer Solution 14, containing Polymer 14 | | | | | | 40.0 | |
| Aqueous Polymer Solution 15, containing Polymer 15 | | | | | | | 40.0 |
| Aqueous Polymer Solution 16, containing Polymer 16 | | | | | 40.0 | | |
| BYK333 (Byk Chemie) (MW8,000/HLB10) | | | | 1.0 | 1.0 | 1.0 | 1.0 |
| X-22-4272 (Shin-Etsu Chemical) (MW4,200/HLB7) | 0.5 | | | | | | |
| Compound 5 (MW7,700/HLB7) | | 0.5 | | | | | |
| Compound 6 (MW50,400/HLB7) | | | 0.5 | | | | |
| Water | 44.5 | 44.5 | 44.5 | 44.0 | 44.0 | 44.0 | 44.0 |

TABLE 4-7

Formulation of Liquid Composition (Unit: %)

| | Liquid Composition | | | | | | | | | | | |
|---|---|---|---|---|---|---|---|---|---|---|---|---|
| | 61 | 62 | 63 | 64 | 65 | 66 | 67 | 68 | 69 | 70 | 71 | 72 |
| Glycerol | 5.0 | 5.0 | 5.0 | 5.0 | 5.0 | 5.0 | | | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 | 5.0 | 5.0 | 5.0 | 5.0 | 5.0 | 5.0 |
| 2-Pyrrolidone | | | | | | | 10.0 | 10.0 | | | | |
| Aqueous Polymer Solution 11, containing Polymer 11 | 40.0 | 40.0 | 40.0 | 40.0 | 40.0 | 40.0 | 40.0 | 40.0 | 40.0 | 25.0 | 24.0 | 42.0 |
| FZ-2203 (Dow Corning Toray) (MW33,400/HLB1) | 0.5 | | | | | | | | | | | |
| FZ-2207 (Dow Corning Toray) (MW29,300/HLB3) | | 0.5 | | | | | | | | 0.5 | 0.5 | |
| FZ-2222 (Dow Corning Toray) (MW27,400/HLB5) | | | 0.5 | | | | 2.9 | 3.0 | 0.4 | | | 0.5 |
| FZ-2231 (Dow Corning Toray) (MW29,200/HLB3) | | | | 0.5 | | | | | | | | |
| Compound 7 (MW49,000/HLB6) | | | | | 0.5 | | | | | | | |
| Compound 8 (MW8,800/HLB6) | | | | | | 0.5 | | | | | | |
| Water | 44.5 | 44.5 | 44.5 | 44.5 | 44.5 | 44.5 | 37.1 | 37.0 | 44.6 | 59.5 | 60.5 | 42.5 |

TABLE 4-8

Formulation of Liquid Composition (Unit: %)

| | Liquid Composition | | | | | | | | | | | | |
|---|---|---|---|---|---|---|---|---|---|---|---|---|---|
| | 73 | 74 | 75 | 76 | 77 | 78 | 79 | 80 | 81 | 82 | 83 | 84 | 85 |
| Glycerol | 5.0 | 5.0 | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 | 5.0 | 5.0 | 5.0 | 5.0 | 5.0 | 5.0 | 5.0 |
| Aqueous Polymer Solution 1, containing Polymer 1 | 40.0 | | | | | | | | | | | | |
| Aqueous Polymer Solution 2, containing Polymer 2 | | 40.0 | | | | | | | | | | | |
| Aqueous Polymer Solution 3, containing Polymer 3 | | | 40.0 | | | | | | | | | | |
| Aqueous Polymer Solution 4, containing Polymer 4 | | | | 40.0 | | | | | | | | | |
| Aqueous Polymer Solution 5, containing Polymer 5 | | | | | 40.0 | | | | | | | | |
| Aqueous Polymer Solution 6, containing Polymer 6 | | | | | | 40.0 | | | | | | | |
| Aqueous Polymer Solution 7, containing Polymer 7 | | | | | | | 40.0 | | | | | | |
| Aqueous Polymer Solution 8, containing Polymer 8 | | | | | | | | 40.0 | | | | | |
| Aqueous Polymer Solution 9, containing Polymer 9 | | | | | | | | | 40.0 | | | | |

TABLE 4-8-continued

Formulation of Liquid Composition (Unit: %)

| | Liquid Composition | | | | | | | | | | | | |
|---|---|---|---|---|---|---|---|---|---|---|---|---|---|
| | 73 | 74 | 75 | 76 | 77 | 78 | 79 | 80 | 81 | 82 | 83 | 84 | 85 |
| Aqueous Polymer Solution 10, containing Polymer 10 | | | | | | | | | | 40.0 | | | |
| Aqueous Polymer Solution 11, containing Polymer 11 | | | | | | | | | | | | 40.0 | 40.0 |
| Aqueous Polymer Solution 12, containing Polymer 12 | | | | | | | | | | | 40.0 | | |
| FZ-2207 (Dow Corning Toray) (MW29,300/HLB3) | 0.5 | 0.5 | 0.5 | 0.5 | 0.5 | 0.5 | 0.5 | 0.5 | 0.5 | 0.5 | 0.5 | 1.0 | |
| Compound 11 (MW8,800/HLB1) | | | | | | | | | | | | | 0.5 |
| Water | 44.5 | 44.5 | 44.5 | 44.5 | 44.5 | 44.5 | 44.5 | 44.5 | 44.5 | 44.5 | 44.5 | 44.0 | 44.5 |

TABLE 4-9

Formulation of Liquid Composition (Unit: %)

| | Liquid Composition | | | | | | | | |
|---|---|---|---|---|---|---|---|---|---|
| | 86 | 87 | 88 | 89 | 90 | 91 | 92 | 93 | 94 |
| Glycerol | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 | 5.0 | 5.0 | 5.0 |
| Aqueous Polymer Solution 11, containing Polymer 11 | 40.0 | 40.0 | 40.0 | 40.0 | 40.0 | | | | |
| Aqueous Polymer Solution 13, containing Polymer 13 | | | | | | 40.0 | | | |
| Aqueous Polymer Solution 14, containing Polymer 14 | | | | | | | 40.0 | | |
| Aqueous Polymer Solution 15, containing Polymer 15 | | | | | | | | 40.0 | |
| Aqueous Polymer Solution 16, containing Polymer 16 | | | | | | | 40.0 | | |
| FZ-2207 (Dow Corning Toray) (MW29,300/HLB3) | | | | | | 0.5 | 0.5 | 0.5 | 0.5 |
| FZ-2250 (Dow Corning Toray) (MW167,500/HLB1) | 0.5 | | | | | | | | |
| FZ-2208 (Dow Corning Toray) (MW27,500/HLB7) | | 0.5 | | | | | | | |
| Compound 9 (MW49,000/HLB7) | | | 0.5 | | | | | | |
| Compound 10 (MW55,000/HLB6) | | | | 0.5 | | | | | |
| Compound 12 (MW7,800/HLB6) | | | | | 0.5 | | | | |
| Water | 44.5 | 44.5 | 44.5 | 44.5 | 44.5 | 44.5 | 44.5 | 44.5 | 44.5 |

TABLE 4-10

Formulation of Liquid Composition (Unit: %)

| | Liquid Composition | | | | | | | | | | | |
|---|---|---|---|---|---|---|---|---|---|---|---|---|
| | 95 | 96 | 97 | 98 | 99 | 100 | 101 | 102 | 103 | 104 | 105 | 106 |
| Glycerol | 5.0 | 5.0 | 5.0 | 5.0 | 5.0 | 5.0 | 5.0 | 5.0 | 5.0 | 5.0 | 5.0 | 5.0 |
| Diethylene glycol | 5.0 | 5.0 | 5.0 | 5.0 | 5.0 | 5.0 | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 | 5.0 | 5.0 | 5.0 | 5.0 | 5.0 | 5.0 |

TABLE 4-10-continued

Formulation of Liquid Composition (Unit: %)

| | Liquid Composition | | | | | | | | | | | |
|---|---|---|---|---|---|---|---|---|---|---|---|---|
| | 95 | 96 | 97 | 98 | 99 | 100 | 101 | 102 | 103 | 104 | 105 | 106 |
| Aqueous Polymer Solution 17, containing Polymer 17 | 40.0 | | | | | | | | | | | |
| Aqueous Polymer Solution 18, containing Polymer 18 | | 40.0 | | | | | | | | 25.0 | 24.0 | 42.0 |
| Aqueous Polymer Solution 19, containing Polymer 19 | | | 40.0 | | | | | | | | | |
| Aqueous Polymer Solution 20, containing Polymer 20 | | | | 40.0 | | | | | | | | |
| Aqueous Polymer Solution 21, containing Polymer 21 | | | | | 40.0 | | | | | | | |
| Aqueous Polymer Solution 22, containing Polymer 22 | | | | | | 40.0 | | | | | | |
| Aqueous Polymer Solution 23, containing Polymer 23 | | | | | | | 40.0 | | | | | |
| Aqueous Polymer Solution 24, containing Polymer 24 | | | | | | | | 40.0 | | | | |
| Aqueous Polymer Solution 25, containing Polymer 25 | | | | | | | | | 40.0 | | | |
| FZ-2104 (Dow Corning Toray) (MW20,600/HLB9) | 0.5 | 0.5 | 0.5 | 0.5 | 0.5 | 0.5 | 0.5 | 0.5 | 0.5 | 0.5 | 0.5 | 0.5 |
| Water | 44.5 | 44.5 | 44.5 | 44.5 | 44.5 | 44.5 | 44.5 | 44.5 | 44.5 | 59.5 | 60.5 | 42.5 |

TABLE 4-11

Formulation of Liquid Composition (Unit: %)

| | Liquid Composition | | | | | |
|---|---|---|---|---|---|---|
| | 107 | 108 | 109 | 110 | 111 | 112 |
| Glycerol | 5.0 | 5.0 | 5.0 | 5.0 | 5.0 | 5.0 |
| Diethylene glycol | 5.0 | 5.0 | 5.0 | 5.0 | 5.0 | 5.0 |
| Polyethylene glycol (av. molecular weight: 1,000) | 5.0 | 5.0 | 5.0 | 5.0 | 5.0 | 5.0 |
| Aqueous Polymer Solution 11, containing Polymer 11 | | | 40.0 | 40.0 | 40.0 | |
| Aqueous Polymer Solution 26, containing Polymer 26 | 40.0 | | | | | |
| Aqueous Polymer Solution 27, containing Polymer 27 | | | | | | 40.0 |
| Aqueous Polymer Solution 28, containing Polymer 28 | | 40.0 | | | | |
| FZ-2104 (Dow Corning Toray) (MW20,600/HLB9) | 0.5 | 0.5 | | | | 0.5 |
| BYK307 (Byk Chemie) (MW31,500) | | | 2.9 | | | |
| BYK347 (Byk Chemie) (MW1,500) | | | | 2.9 | | |
| BYK348 (Byk Chemie) (MW2,800) | | | | | 2.9 | |
| Water | 44.5 | 44.5 | 42.1 | 42.1 | 42.1 | 44.5 |

Preparation of Inks

Components shown in Table 5 below were mixed, and were thoroughly stirred, followed by pressure filtration with a filter of 2.5 μm in pore size (trade name: HD CII, available from Nihon Pall Ltd.) to prepare Inks 1 to 3.

TABLE 5

Ink Formulation (Unit: %)

| | Ink 1 | Ink 2 | Ink 3 |
|---|---|---|---|
| Pigment Dispersion 1 Polymer 11; polymer conc.: 5% | 40.0 | | |
| Pigment Dispersion 2 Polymer 13; polymer conc.: 5% | | 40.0 | |
| Pigment Dispersion 3 Polymer 18; polymer conc.: 5% | | | 40.0 |
| Aqueous Polymer Solution 11, containing Polymer 11; polymer conc.: 10% | 20.0 | | |
| Aqueous Polymer Solution 13, containing Polymer 13; polymer conc.: 10% | | 20.0 | |
| Aqueous Polymer Solution 18, containing Polymer 18; polymer conc.: 10% | | | 20.0 |
| Glycerol | 5.0 | 5.0 | 5.0 |
| Polyethylene glycol (av. molecular weight: 1,000) | 5.0 | 5.0 | 5.0 |
| 1,2-Hexanediol | 5.0 | 5.0 | 5.0 |
| ACETYLENOL EH (*1) | 1.0 | 1.0 | 1.0 |
| Water | 24.0 | 24.0 | 24.0 |

(*1): Acetylene glycol ethylene oxide addition product (surface-active agent, available from Kawaken Fine Chemicals Co., Ltd.)

On the liquid compositions and inks obtained as above, their surface tension at 25° C. was measured with Kyowa CBVP type surface tension meter, Model A-1 (manufactured by Kyowa Interface Science Co., Ltd.). As the result, the surface tension of all the liquid compositions was found to be higher than the surface tension of all the inks.

Evaluation

Storage Stability:

Each liquid composition obtained as above was put into a container made of TEFLON (trade name) and was left standing at a temperature of 60° C. for a month. Thereafter, the state of the liquid composition after it was returned to room temperature and the state of the liquid composition before storage were visually observed to evaluate storage stability. The storage stability was evaluated according to the evaluation criteria as shown below. The results are shown in Tables 6-1 to 6-4.

A: The liquid composition did not change in transparency before and after storage.

B: The liquid composition did not change in transparency before and after storage, but some suspended matter was seen in the liquid composition after storage.

C: After storage, deposits were formed in the container made of TEFLON (trade name).

Ejection Property:

(State of Orifice Face and Ejection Stability)

An ink cartridge of an ink jet recording apparatus (trade name: PIXUS 850i; manufactured by CANON INC.) was filled with each liquid composition obtained as above, and was set in an modified apparatus of the ink jet recording apparatus at its position of cyan ink. Then, on three sheets of Office Planner (available from CANON INC.), images of 50% in recording duty and 18 cm×24 cm in size were recorded in a default mode. In this recording, the cleaning of the recording head surface was performed at intervals of once for each recording on one sheet by using a wiper blade of PIXUS 850i. Thereafter, a nozzle check pattern for PIXUS 850i was recorded on CF102 (available from CANON INC.). The state of the recording head surface at this recording was visually examined to evaluate the state of the orifice face. The state of the orifice face was evaluated according to the evaluation criteria as shown below. The results are shown in Tables 6-1 to 6-4. The nozzle check pattern was also visually examined to evaluate ejection stability. The ejection stability was evaluated according to the evaluation criteria as shown below. The results are shown in Tables 6-1 to 6-4.

(State of Orifice Face)

A: Almost no liquid composition was present around ejection orifices.

B: Droplets of the liquid composition were somewhat present around ejection orifices.

C: Liquid films of the liquid composition in belt form were present around ejection orifices.

(Ejection Stability)

A: Recording was normally performable without any disruption in the nozzle check pattern.

B: Disruption was somewhat seen in the nozzle check pattern, but any faulty ejection was not seen.

C: Obvious faulty ejection and disruption were seen in the nozzle check pattern, and normal recording was not performable.

Scratch Resistance:

Each liquid composition and each ink obtained as above were used in combination as shown in Tables 6-1 to 6-4 below, and images (reference evaluation images) were formed in the following way. Ink cartridges of an ink jet recording apparatus (trade name: BJ F900; manufactured by CANON INC.) were respectively filled with the liquid composition and the ink. The liquid composition was set in the ink jet recording apparatus at its position of yellow ink, and the ink at its position of magenta ink. Then, using the ink, images having a recording duty of 100% were formed at an ejection quantity of 4.5 ng, at a resolution of 1,200 dpi×1,200 dpi and in 8-pass one-way recording. After the ink was applied onto the recording medium as above, the liquid composition was also applied over the areas of images formed by the ink and their surroundings, at an ejection quantity of 4.5 ng, at a resolution of 1,200 dpi×1,200 dpi, in 8-pass one-way recording and at a recording duty of 50%. Recorded images obtained were left standing at room temperature for a day, and thereafter the images were scratched with finger nails under application of such a strong pressure as to scratch the recording medium at its non-recorded areas. The recorded images thus scratched were visually observed to evaluate their scratch resistance. The scratch resistance was evaluated according to the evaluation criteria as shown below. The results are shown in Tables 6-1 to 6-4.

A: No nail mark was left on the surfaces of images.

B: Nail marks were left on the surfaces of images, but no coloring material was scraped off.

C: Nail marks were left on the surfaces of images, and the coloring material was scraped off slightly.

D: The coloring material was scraped off obviously, though the surface of the recording medium was not exposed.

E: There was no problem when images were gently touched, but the coloring material was scraped off to such an extent that the surface of the recording medium was revealed when the images were scratched under application of such a strong pressure as to scratch the recording medium at its non-recorded areas.

Coefficient of Dynamic Friction:

The coefficient of dynamic friction in image areas of the recorded images obtained as above (reference evaluation images) was measured in the following way. Stated specifically, in the image areas of the reference evaluation images, the coefficient of dynamic friction of the images against a polymethyl methacrylate (PMMA) ball was measured with a surface property tester (trade name: HEIDON TRIBOGEAR Type 14DR, manufactured by Shinto Kagaku K.K.). Setting the vertical load to be applied to the PMMA ball at 50 g, and its movement speed at 2 mm/sec, the horizontal force acting in the direction of movement of the PMMA ball when it was moved was measured through a load cell, where the ratio of horizontal-direction force to vertical-load force was calculated as the coefficient of dynamic friction. The values thus found on the coefficient of dynamic friction are shown in Tables 6-1 to 6-4.

TABLE 6-1

Evaluation Results

| | | Combination | | Storage stability | Ejection performance of liquid composition | | Properties of images | |
|---|---|---|---|---|---|---|---|---|
| | | Liquid Composition | Ink | of liquid composition | State of orifice face | Ejection stability | Scratch resistance | Coefficient of dynamic friction |
| Example | 1 | 1 | 1 | A | B | A | B | 0.19 |
| | 2 | 2 | 1 | A | B | A | C | 0.39 |
| | 3 | 3 | 1 | A | B | A | B | 0.29 |
| | 4 | 4 | 1 | A | B | A | B | 0.28 |
| | 5 | 5 | 1 | A | B | A | B | 0.27 |
| | 6 | 6 | 1 | A | B | A | C | 0.35 |
| | 7 | 7 | 1 | A | B | A | C | 0.39 |
| | 8 | 8 | 1 | A | B | B | B | 0.20 |
| | 9 | 9 | 1 | B | B | B | B | 0.21 |
| | 10 | 10 | 1 | A | B | A | C | 0.40 |
| | 11 | 11 | 1 | A | B | A | C | 0.30 |
| | 12 | 12 | 1 | A | B | A | C | 0.34 |
| | 13 | 13 | 1 | A | B | B | B | 0.19 |
| | 14 | 14 | 1 | A | A | A | B | 0.28 |
| | 15 | 15 | 1 | A | A | A | B | 0.29 |
| | 16 | 16 | 1 | A | A | A | B | 0.27 |
| | 17 | 17 | 1 | A | A | A | B | 0.25 |
| | 18 | 18 | 1 | A | A | A | C | 0.39 |
| | 19 | 19 | 1 | A | B | B | A | 0.05 |
| | 20 | 20 | 1 | A | A | A | B | 0.23 |
| | 21 | 21 | 1 | A | A | A | B | 0.21 |
| | 22 | 22 | 1 | A | A | A | B | 0.29 |
| | 23 | 23 | 1 | A | B | A | B | 0.11 |
| | 24 | 24 | 1 | A | B | A | B | 0.16 |
| | 25 | 25 | 1 | A | B | A | B | 0.16 |
| | 26 | 1 | 2 | A | B | A | B | 0.25 |
| Comp. Example | 1 | 26 | 1 | A | B | A | E | 0.78 |
| | 2 | 27 | 1 | A | B | A | E | 0.80 |
| | 3 | 28 | 1 | A | B | A | E | 0.75 |
| | 4 | 29 | 1 | A | B | A | D | 0.43 |
| | 5 | 30 | 1 | A | A | A | E | 0.51 |
| | 6 | 31 | 1 | A | A | A | D | 0.50 |
| Ref. Example | 1 | 32 | 1 | A | C | C | A | 0.05 |
| | 2 | 33 | 1 | C | C | B | B | 0.22 |

The evaluation results of ejection stability were "B" both in Examples 8 and 9. However, the disrupted state of the nozzle check pattern was somewhat less in Example 8 than in Example 9. At that time, the state of kogation on the recording head heater was observed on an optical microscope to find that the occurrence of kogation was less in Example 8 than in Example 9.

TABLE 6-2

Evaluation Results

| | | Combination | | Storage stability of liquid composition | Ejection property of liquid composition | | Properties of images | |
|---|---|---|---|---|---|---|---|---|
| | | Liquid Composition | Ink | | State of orifice face | Ejection stability | Scratch resistance | Coefficient of dynamic friction |
| Example | 27 | 34 | 1 | A | B | A | C | 0.40 |
| | 28 | 35 | 1 | A | B | A | C | 0.38 |
| | 29 | 36 | 1 | A | B | B | B | 0.12 |
| | 30 | 37 | 1 | B | B | B | A | 0.10 |
| | 31 | 38 | 1 | A | B | A | C | 0.40 |
| | 32 | 39 | 1 | A | B | A | B | 0.23 |
| | 33 | 40 | 1 | A | A | A | C | 0.30 |
| | 34 | 41 | 1 | A | A | A | C | 0.34 |
| | 35 | 42 | 1 | A | B | B | B | 0.21 |
| | 36 | 43 | 1 | A | A | A | C | 0.32 |
| | 37 | 44 | 1 | A | A | A | C | 0.36 |
| | 38 | 45 | 1 | A | A | A | C | 0.34 |
| | 39 | 46 | 1 | A | A | A | C | 0.32 |
| | 40 | 47 | 1 | A | A | A | C | 0.40 |
| | 41 | 48 | 1 | A | B | B | A | 0.09 |
| | 42 | 49 | 1 | A | A | A | B | 0.25 |
| | 43 | 50 | 1 | A | A | A | B | 0.22 |
| | 44 | 51 | 1 | A | A | A | B | 0.29 |
| | 45 | 52 | 1 | A | B | A | B | 0.11 |
| | 46 | 53 | 1 | A | B | A | B | 0.16 |
| | 47 | 39 | 2 | A | B | A | B | 0.29 |
| Comp. Example | 7 | 54 | 1 | A | B | A | E | 0.58 |
| | 8 | 55 | 1 | A | B | A | D | 0.41 |
| | 9 | 56 | 1 | A | B | B | D | 0.45 |
| | 10 | 57 | 1 | A | A | A | D | 0.48 |
| | 11 | 58 | 1 | A | A | A | D | 0.49 |
| Ref. Example | 3 | 59 | 1 | A | C | C | A | 0.08 |
| | 4 | 60 | 1 | C | C | B | B | 0.26 |

The evaluation results of ejection stability were "B" both in Examples 29 and 30. However, the disrupted state of the nozzle check pattern was somewhat less in Example 29 than in Example 30. The reason therefor may be that the state of kogation on the recording head heater was better in Example 29 than in example 30 when observed on an optical microscope.

TABLE 6-3

Evaluation Results

| | | Combination | | Storage stability of liquid composition | Ejection property of liquid composition | | Properties of images | |
|---|---|---|---|---|---|---|---|---|
| | | Liquid Composition | Ink | | State of orifice face | Ejection stability | Scratch resistance | Coefficient of dynamic friction |
| Example | 48 | 61 | 1 | B | B | A | B | 0.15 |
| | 49 | 62 | 1 | A | B | A | B | 0.14 |
| | 50 | 63 | 1 | A | B | A | C | 0.36 |
| | 51 | 64 | 1 | A | B | A | B | 0.13 |
| | 52 | 65 | 1 | A | B | A | C | 0.39 |
| | 53 | 66 | 1 | A | B | A | C | 0.37 |

TABLE 6-3-continued

| | | Combination | | Storage stability | Ejection property of liquid composition | | Properties of images | |
|---|---|---|---|---|---|---|---|---|
| | | Liquid Composition | Ink | of liquid composition | State of orifice face | Ejection stability | Scratch resistance | Coefficient of dynamic friction |
| | 54 | 67 | 1 | A | B | B | B | 0.17 |
| | 55 | 68 | 1 | B | B | B | B | 0.16 |
| | 56 | 69 | 1 | A | B | A | C | 0.40 |
| | 57 | 70 | 1 | A | A | A | B | 0.30 |
| | 58 | 71 | 1 | A | A | A | C | 0.33 |
| | 59 | 72 | 1 | A | B | B | C | 0.33 |
| | 60 | 73 | 1 | A | A | A | B | 0.24 |
| | 61 | 74 | 1 | A | A | A | C | 0.32 |
| | 62 | 75 | 1 | A | A | A | B | 0.20 |
| | 63 | 76 | 1 | A | A | A | B | 0.18 |
| | 64 | 77 | 1 | A | A | A | C | 0.38 |
| | 65 | 78 | 1 | A | B | B | A | 0.03 |
| | 66 | 79 | 1 | A | A | A | B | 0.14 |
| | 67 | 80 | 1 | A | A | A | B | 0.13 |
| | 68 | 81 | 1 | A | A | A | B | 0.20 |
| | 69 | 82 | 1 | A | B | A | A | 0.05 |
| | 70 | 83 | 1 | A | B | A | A | 0.06 |
| | 71 | 84 | 1 | A | B | A | A | 0.08 |
| | 72 | 62 | 2 | A | B | A | B | 0.21 |
| | 73 | 85 | 1 | B | B | A | C | 0.32 |
| Comp. Example | 12 | 86 | 1 | A | B | A | D | 0.46 |
| | 13 | 87 | 1 | A | B | A | D | 0.45 |
| | 14 | 88 | 1 | A | B | A | D | 0.43 |
| | 15 | 89 | 1 | A | B | A | D | 0.44 |
| | 16 | 90 | 1 | A | B | A | D | 0.45 |
| | 17 | 91 | 1 | A | A | A | E | 0.51 |
| | 18 | 92 | 1 | A | A | A | D | 0.50 |
| Ref. Example | 5 | 93 | 1 | A | C | C | A | 0.04 |
| | 6 | 94 | 1 | C | C | C | B | 0.12 |

The evaluation results of ejection stability were "B" both in Examples 54 and 55. However, the disrupted state of the nozzle check pattern was somewhat less in Example 54 than in Example 55. At that time, the state of any kogation on the recording head heater was observed with an optical microscope to find that the occurrence of kogation was less in Example 54 than in Example 55.

TABLE 6-4

| | | Combination | | Storage stability | Ejection property of liquid composition | | Properties of images | |
|---|---|---|---|---|---|---|---|---|
| | | Liquid Composition | Ink | of liquid composition | State of orifice face | Ejection stability | Scratch resistance | Coefficient of dynamic friction |
| Example | 74 | 95 | 3 | A | A | A | C | 0.31 |
| | 75 | 96 | 3 | A | B | A | B | 0.25 |
| | 76 | 97 | 3 | A | A | A | C | 0.36 |
| | 77 | 98 | 3 | A | A | A | C | 0.33 |
| | 78 | 99 | 3 | A | B | A | B | 0.22 |
| | 79 | 100 | 3 | A | B | A | B | 0.29 |
| | 80 | 101 | 3 | A | A | A | C | 0.38 |
| | 81 | 102 | 3 | A | B | A | B | 0.29 |
| | 82 | 103 | 3 | A | B | A | B | 0.27 |
| | 83 | 104 | 3 | A | A | A | B | 0.30 |
| | 84 | 105 | 3 | A | A | A | C | 0.36 |
| | 85 | 106 | 3 | A | B | B | B | 0.22 |

TABLE 6-4-continued

| | | Combination | | Storage stability of liquid composition | Ejection property of liquid composition | | Properties of images | |
|---|---|---|---|---|---|---|---|---|
| | | Liquid Composition | Ink | | State of orifice face | Ejection stability | Scratch resistance | Coefficient of dynamic friction |
| Comp. Example | 19 | 107 | 3 | A | A | A | D | 0.43 |
| | 20 | 108 | 3 | A | A | A | D | 0.47 |
| | 21 | 109 | 1 | A | B | A | E | 0.55 |
| | 22 | 110 | 1 | A | B | A | E | 0.65 |
| | 23 | 111 | 1 | A | B | A | E | 0.64 |
| Ref. Example | 7 | 112 | 3 | A | C | C | B | 0.21 |

Each liquid composition and each ink obtained as above were used in combination as shown in Table 7 below, and images (reference evaluation images) were formed in the following way. Ink cartridges of an ink jet recording apparatus (trade name: BJ F900; manufactured by CANON INC.) were respectively filled with the liquid composition and the ink. The liquid composition was set in the ink jet recording apparatus at its position of yellow ink, and the ink at its position of magenta ink. Then, using the ink, images having a recording duty of 100% were formed at an ejection quantity of 4.5 ng, at a resolution of 1,200 dpi×1,200 dpi and in 8-pass one-way recording. After the ink was applied onto the recording medium as above, the liquid composition was also applied over the areas of images formed by the ink and their surroundings, at an ejection quantity of 4.5 ng, at a resolution of 1,200 dpi×1,200 dpi, in 8-pass one-way recording and at a recording duty of 25%. On the recorded images obtained, their scratch resistance and coefficient of dynamic friction were evaluated in the same way and according to the same evaluation criteria as the above. The results are shown in Table 7.

TABLE 7

| | Evaluation Results | | | |
|---|---|---|---|---|
| | Liquid Composition | Ink | Scratch resistance | Coefficient of dynamic friction |
| Example 86 | 25 | 1 | B | 0.20 |
| Example 87 | 39 | 1 | C | 0.28 |
| Example 88 | 84 | 1 | B | 0.15 |
| Example 89 | 96 | 1 | C | 0.30 |

Each liquid composition and each ink obtained as above were used in combination as shown in Table 8 below, and images (reference evaluation images) were formed in the following way. Ink cartridges of an ink jet recording apparatus (trade name: BJ F900; manufactured by CANON INC.) were respectively filled with the liquid composition and the ink. The liquid composition was set in the ink jet recording apparatus at its position of magenta ink, and the ink at its position of yellow ink. Then, before the ink was applied onto the recording medium, the liquid composition was applied over the areas of images to be formed by the ink and their surroundings, at an ejection quantity of 4.5 ng, at a resolution of 1,200 dpi×1,200 dpi, in 8-pass one-way recording and at a recording duty of 50%. After the liquid composition was applied onto the recording medium as above, using the ink, images having a recording duty of 100% were formed at an ejection quantity of 4.5 ng, at a resolution of 1,200 dpi×1,200 dpi and in 8-pass one-way recording. On the recorded images obtained, their scratch resistance and coefficient of dynamic friction were evaluated in the same way and according to the same evaluation criteria as the above. The results are shown in Table 8.

TABLE 8

| | Evaluation Results | | | |
|---|---|---|---|---|
| | Liquid Composition | Ink | Scratch resistance | Coefficient of dynamic friction |
| Example 90 | 25 | 1 | C | 0.35 |
| Example 91 | 39 | 1 | C | 0.31 |
| Example 92 | 84 | 1 | C | 0.32 |
| Example 93 | 96 | 1 | C | 0.39 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-031329, filed Feb. 9, 2007, 2007-030897, filed Feb. 9, 2007, 2007-031184, filed Feb. 9, 2007 and 2008-014933, filed Jan. 25, 2008, which are hereby incorporated by reference herein in their entirety.

What is claimed is:
1. A liquid composition comprising:
a modified siloxane compound;
water; and
a polymer,
wherein the liquid composition contains no coloring material,
wherein the content (% by mass) of water in the liquid composition is from 50.0% by mass or more to 95.0% by mass or less based on the total mass of the liquid composition,
wherein the modified siloxane compound is at least one selected from the group consisting of a modified siloxane compound represented by the following Formula (1), a modified siloxane compound represented by the following Formula (2), and a modified siloxane compound represented by the following Formula (3), and wherein the polymer is at least one selected from the group consisting of a polymer A which has an acid value of from 90 mgKOH/g or more to 150 mgKOH/g or less and in which a hydrogen bond parameter (δh) of the polymer that is obtained by the solubility parameters of monomers constituting the polymer is from $1.0 \text{ cal}^{0.5}/\text{cm}^{1.5}$ or more to $3.7 \text{ cal}^{0.5}/\text{cm}^{1.5}$ or less, and a polymer B which has an acid value of from more than 150 mgKOH/g to 200 mgKOH/g or less and in which a hydrogen bond parameter (δh) of the polymer that is obtained by the solubility parameters of monomers constituting the polymer is from $1.0 \text{ cal}^{0.5}/\text{cm}^{1.5}$ or more to $1.5 \text{ cal}^{0.5}/\text{cm}^{1.5}$ or less:

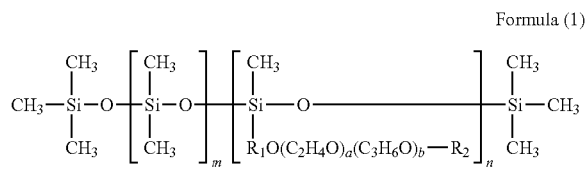

Formula (1)

where the modified siloxane compound represented by Formula (1) has a weight average molecular weight of from 8,000 or more to 30,000 or less; in Formula (1), $R_1$ is an alkylene group having 1 to 20 carbon atom(s), $R_2$ is a hydrogen atom or an alkyl group having 1 to 20 carbon atom(s), m is from 1 or more to 250 or less, n is from 1 or more to 100 or less, a is from 1 or more to 100 or less, and b is from 0 or more to 100 or less;

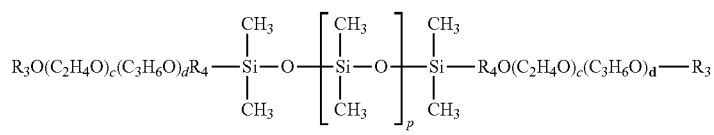

Formula (2)

where the modified siloxane compound represented by Formula (2) has a weight average molecular weight of from 8,000 or more to less than 50,000; in Formula (2), $R_3$s are each independently a hydrogen atom or an alkyl group having 1 to 20 carbon atom(s), $R_4$s are each independently an alkylene group having 1 to 20 carbon atom(s), p is from 1 or more to 450 or less, c is from 1 or more to 250 or less, and d is from 0 or more to 100 or less; and

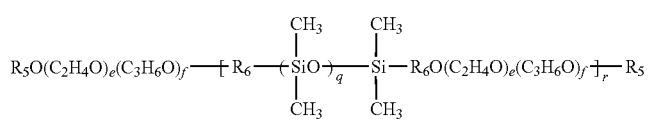

Formula (3)

where the modified siloxane compound represented by Formula (3) has a weight average molecular weight of from 8,000 or more to less than 50,000 and an HLB of from 1 or more to less than 7; in Formula (3), $R_5$s are each independently a hydrogen atom or an alkyl group having 1 to 20 carbon atom(s), $R_6$ is an alkylene group having 1 to 20 carbon atom(s), q is from 1 or more to 100 or less, r is from 1 or more to 100 or less, e is from 1 or more to 100 or less, and f is from 0 or more to 100 or less.

2. The liquid composition according to claim 1, wherein the modified siloxane compound represented by Formula (1) has an HLB of from 5 or more to 11 or less.

3. The liquid composition according to claim 1, wherein the polymer A comprises at least one type of monomer selected from the group consisting of styrene, n-butyl acrylate and benzyl methacrylate.

4. The liquid composition according to claim 1, wherein the polymer B comprises at least one type of monomer selected from the group consisting of styrene and α-methylstyrene.

5. The liquid composition according to claim 1, wherein the content (% by mass) of the polymer in the liquid composition is from 2.5% by mass or more to less than 4.0% by mass based on the total mass of the liquid composition.

6. The liquid composition according to claim 1, wherein the content (% by mass) of the modified siloxane compound is from 0.5% by mass or more to less than 3.0% by mass based on the total mass of the liquid composition.

7. An image forming method comprising the step of applying a pigment ink onto a recording medium and the step of applying a liquid composition onto the recording medium, wherein the liquid composition according to claim 1 is used as the liquid composition.

8. The image forming method according to claim 7, wherein the step of applying the liquid composition onto a recording medium is carried out after the step of applying a pigment ink onto the recording medium.

9. The image forming method according to claim 7, wherein an ink comprising a pigment and a polymer having an acid value of from 90 mgKOH/g or more to 200 mgKOH/g or less is used as the pigment ink.

10. The image forming method according to claim 7, wherein the pigment ink and the liquid composition are applied onto the recording medium by ink jet method.

11. A recording unit comprising a liquid composition storing portion which stores a liquid composition therein and a recording head which ejects the liquid composition therefrom, wherein the liquid composition stored in the liquid composition storing portion is the liquid composition according to claim 1.

12. An ink jet recording apparatus comprising a liquid composition storing portion which stores a liquid composition therein and a recording head which ejects the liquid composition therefrom, wherein the liquid composition stored in the liquid composition storing portion is the liquid composition according to claim 1.

13. The liquid composition according to claim 1, wherein the content (% by mass) of the polymer in the liquid composition is from 0.5% by mass or more to 5.0% by mass or less based on the total mass of the liquid composition.

14. The liquid composition according to claim 1, wherein the hydrogen bond parameter (δh) for polymer A is from 1.2 $cal^{0.5}/cm^{1.5}$ or more to 1.8 $cal^{0.5}/cm^{1.5}$ or less, and the hydrogen bond parameter (δh) for polymer B is from 1.2 $cal^{0.5}/cm^{1.5}$ or more to 1.5 $cal^{0.5}/cm^{1.5}$ or less.

15. The liquid composition according to claim 1, wherein for each of Formulae (1)-(3), the modified siloxane compound has a weight average molecular weight of from 8,500 or more to 30,000 or less.

16. The liquid composition according to claim 1, wherein the liquid composition is used for performing recording on paper.

17. A cartridge comprising a liquid composition storing portion which stores a liquid composition therein, wherein the liquid composition stored in the liquid composition storing portion is the liquid composition according to claim 1.

* * * * *